US012300005B2

(12) United States Patent
Scott et al.

(10) Patent No.: US 12,300,005 B2
(45) Date of Patent: May 13, 2025

(54) METHODS AND SYSTEMS FOR DETERMINING ACCURACY OF SPORT-RELATED INFORMATION EXTRACTED FROM DIGITAL VIDEO FRAMES

(71) Applicant: Gracenote, Inc., New York, NY (US)

(72) Inventors: Jeffrey Scott, Oakland, CA (US); Markus Kurt Peter Cremer, Orinda, CA (US); Nishit Umesh Parekh, Woodland Hills, CA (US); Dewey Ho Lee, Berkeley, CA (US)

(73) Assignee: Gracenote, Inc., New York, NY (US)

( * ) Notice: Subject to any disclaimer, the term of this patent is extended or adjusted under 35 U.S.C. 154(b) by 0 days.

(21) Appl. No.: 18/499,799

(22) Filed: Nov. 1, 2023

(65) Prior Publication Data

US 2024/0119744 A1 Apr. 11, 2024

Related U.S. Application Data

(63) Continuation of application No. 17/364,349, filed on Jun. 30, 2021, now Pat. No. 11,830,261, which is a
(Continued)

(51) Int. Cl.
*G06V 20/62* (2022.01)
*G06T 7/13* (2017.01)
(Continued)

(52) U.S. Cl.
CPC .............. *G06V 20/635* (2022.01); *G06T 7/13* (2017.01); *G06V 20/42* (2022.01); *H04N 21/2187* (2013.01)

(58) Field of Classification Search
None
See application file for complete search history.

(56) References Cited

U.S. PATENT DOCUMENTS 5,272,527 A 12/1993 Watanabe
6,008,866 A 12/1999 Komatsu
(Continued)

FOREIGN PATENT DOCUMENTS

KR 1020160023518 3/2016
WO 2010/083021 7/2010

OTHER PUBLICATIONS

Berkun et al. "Detection of Score Changes in Sport Videos Using Textual Overlays," 7th International Symposium on Image and Signal Processing and Analysis (ISPA 2011 ), pp. 301-306.
(Continued)

*Primary Examiner* — Vikkram Bali
(74) *Attorney, Agent, or Firm* — McDonnell Boehnen Hulbert & Berghoff LLP

(57) ABSTRACT

A computing system determines accuracy of sport-related information extracted from a time sequence of digital video frames that represent a sport event, the extracted sport-related information including an attribute that changes over the time sequence. The computing system (a) detects, based on the extracted sport-related information, a pattern of change of the attribute over the time sequence and (b) makes a determination of whether the detected pattern is an expected pattern of change associated with the sport event. If the determination is that the detected pattern is the expected pattern, then, responsive to making the determination, the computing system takes a first action that corresponds to the sport-related information being accurate. Whereas, if the determination is that the detected pattern is not the expected pattern, then, responsive to making the determination, the computing system takes a second action that corresponds to the sport-related information being inaccurate.

19 Claims, 15 Drawing Sheets

Related U.S. Application Data continuation of application No. 16/257,479, filed on Jan. 25, 2019, now Pat. No. 11,087,161.

(51) Int. Cl.
*G06V 20/40* (2022.01)
*H04N 21/2187* (2011.01)

(56) References Cited

U.S. PATENT DOCUMENTS

| | | | |
|---|---|---|---|
| 6,154,250 A | 11/2000 | Honey et al. | |
| 6,754,367 B1 | 6/2004 | Ito et al. | |
| 6,760,595 B2 | 7/2004 | Inselberg | |
| 7,474,698 B2 | 1/2009 | Pan et al. | |
| 7,639,312 B2 | 12/2009 | Baba et al. | |
| 7,899,250 B2 | 3/2011 | Huang et al. | |
| 7,983,442 B2 | 7/2011 | Chiang et al. | |
| 8,238,719 B2 | 8/2012 | Chen et al. | |
| 8,611,723 B2 | 12/2013 | Aman | |
| 8,749,710 B2 | 6/2014 | Bryan et al. | |
| 9,094,615 B2 | 7/2015 | Aman et al. | |
| 9,141,860 B2 | 9/2015 | Vunic et al. | |
| 9,165,203 B2 | 10/2015 | McCarthy | |
| 9,335,766 B1 | 6/2016 | Silver et al. | |
| 9,553,841 B1 | 1/2017 | Skinner et al. | |
| 9,555,310 B2 | 1/2017 | Aman et al. | |
| 9,591,258 B2 | 3/2017 | Matsuyama | |
| 9,693,030 B2 | 6/2017 | Emeott et al. | |
| 9,955,191 B2 | 4/2018 | Beattie, Jr. et al. | |
| 9,965,695 B1 | 5/2018 | Ming | |
| 10,089,533 B2 | 10/2018 | Katz et al. | |
| 10,250,838 B1 | 4/2019 | Herz | |
| 10,300,376 B2 | 5/2019 | Inagaki et al. | |
| 10,303,951 B2 | 5/2019 | Katz et al. | |
| 10,356,481 B2 | 7/2019 | Chou et al. | |
| 10,404,960 B2 | 9/2019 | Budagavi et al. | |
| 10,503,979 B2 | 12/2019 | Bornfreedom et al. | |
| 10,565,453 B2 | 2/2020 | Vunic et al. | |
| 10,997,424 B2 | 5/2021 | Scott et al. | |
| 11,010,627 B2 | 5/2021 | Scott et al. | |
| 11,036,995 B2 | 6/2021 | Scott et al. | |
| 11,093,781 B2 | 8/2021 | Bhat et al. | |
| 2003/0076448 A1 | 4/2003 | Pan et al. | |
| 2004/0043724 A1 | 3/2004 | Weast | |
| 2004/0130567 A1 | 7/2004 | Ekin et al. | |
| 2004/0255249 A1 | 12/2004 | Chang et al. | |
| 2005/0151841 A1 | 7/2005 | Nelson et al. | |
| 2005/0177847 A1 | 8/2005 | Konig et al. | |
| 2006/0075454 A1 | 4/2006 | Jung et al. | |
| 2006/0187358 A1 | 8/2006 | Lienhart et al. | |
| 2007/0127774 A1 | 6/2007 | Zhang et al. | |
| 2007/0280635 A1 | 12/2007 | Huang et al. | |
| 2007/0291134 A1 | 12/2007 | Hwang et al. | |
| 2008/0089666 A1 | 4/2008 | Aman | |
| 2008/0126160 A1 | 5/2008 | Takuechi et al. | |
| 2008/0130997 A1 | 6/2008 | Huang et al. | |
| 2008/0143880 A1 | 6/2008 | Jung et al. | |
| 2008/0282287 A1 | 11/2008 | Chen et al. | |
| 2009/0060342 A1 | 3/2009 | Chiang et al. | |
| 2009/0290752 A1 | 11/2009 | Kalva | |
| 2010/0002137 A1 | 1/2010 | McKinney et al. | |
| 2010/0212974 A1 | 8/2010 | Kim | |
| 2011/0052061 A1 | 3/2011 | Jeong et al. | |
| 2011/0138418 A1 | 6/2011 | Choi et al. | |
| 2011/0200257 A1 | 8/2011 | Oh et al. | |
| 2011/0213790 A1 | 9/2011 | Fullton et al. | |
| 2011/0222775 A1 | 9/2011 | Aizawa et al. | |
| 2012/0062736 A1 | 3/2012 | Xiong | |
| 2012/0169923 A1 | 7/2012 | Millar et al. | |
| 2012/0219271 A1 | 8/2012 | Vunic et al. | |
| 2012/0237182 A1 | 9/2012 | Eyer | |
| 2013/0155235 A1 | 6/2013 | Clough et al. | |
| 2013/0170711 A1 | 7/2013 | Chigos et al. | |
| 2013/0225292 A1 | 8/2013 | Yamaoka et al. | |
| 2013/0283143 A1 | 10/2013 | Petajan et al. | |
| 2013/0288214 A1 | 10/2013 | Kesavadas et al. | |
| 2013/0293776 A1 | 11/2013 | Shih-Fu et al. | |
| 2014/0168517 A1 | 6/2014 | Petajan et al. | |
| 2014/0218385 A1 | 8/2014 | Carmi | |
| 2014/0270505 A1 | 9/2014 | McCarthy | |
| 2015/0146010 A1 | 5/2015 | Yokozeki | |
| 2015/0181077 A1 | 6/2015 | Misawa et al. | |
| 2015/0248917 A1 | 9/2015 | Chang et al. | |
| 2015/0297949 A1 | 10/2015 | Aman et al. | |
| 2015/0319510 A1 | 11/2015 | Ould Dellahy, VIII et al. | |
| 2016/0247101 A1 | 8/2016 | Agrawal et al. | |
| 2016/0261929 A1 | 9/2016 | Lee et al. | |
| 2016/0350616 A1 | 12/2016 | Yamaji | |
| 2016/0353180 A1 | 12/2016 | Petajan et al. | |
| 2017/0021281 A1 | 1/2017 | Fanning | |
| 2017/0134776 A1 | 5/2017 | Ranjeet et al. | |
| 2017/0155974 A1 | 6/2017 | Stieglitz | |
| 2017/0193307 A1 | 7/2017 | Stelzer et al. | |
| 2017/0223415 A1 | 8/2017 | Jeon | |
| 2017/0238055 A1 | 8/2017 | Chang et al. | |
| 2018/0070146 A1 | 3/2018 | Curtis et al. | |
| 2018/0091858 A1 | 3/2018 | Khazanov et al. | |
| 2018/0131869 A1 | 5/2018 | Kim et al. | |
| 2018/0214760 A1 | 8/2018 | Andrews et al. | |
| 2018/0373953 A1 | 12/2018 | Tomotaki et al. | |
| 2019/0180111 A1 | 6/2019 | Kim et al. | |
| 2019/0251364 A1 | 8/2019 | Park et al. | |
| 2019/0349626 A1 | 11/2019 | Gupta et al. | |
| 2019/0354764 A1 | 11/2019 | Stojancic et al. | |
| 2020/0110941 A1 | 4/2020 | Lee et al. | |
| 2020/0137491 A1 | 4/2020 | Hirose et al. | |
| 2020/0140601 A1 | 5/2020 | Tang et al. | |
| 2020/0189467 A1 | 6/2020 | Kondo et al. | |
| 2020/0242385 A1 | 7/2020 | Scott et al. | |

OTHER PUBLICATIONS

International Search Report and Written Opinion from International Application No. PCT/US2020/014871, dated May 20, 2020.
International Search Report and Written Opinion from International Application No. PCT/US2020/014872, dated May 18, 2020.
International Search Report and Written Opinion from International Application No. PCT/US2020/014873, dated May 20, 2020.
International Search Report and Written Opinion from International Application No. PCT/US2020/014874, dated May 20, 2020.
International Search Report and Written Opinion from International Application No. PCT/US2020/014875, dated May 20, 2020.
Kulkarni et al., "Text Detection and Recognition: A Review," International Research Journal of Engineering and Technology (IRJET), 2017, pp. 179-185, vol. 4, No. 6.
Office Action from U.S. Appl. No. 16/257,373, dated Jun. 9, 2020.
Office Action from U.S. Appl. No. 16/257,339, dated Aug. 24, 2020.
Office Action from U.S. Appl. No. 16/257,400, dated Oct. 27, 2020.
Office Action from U.S. Appl. No. 16/257,424, dated Jun. 8, 2020.
Office Action from U.S. Appl. No. 16/257,424, dated Nov. 13, 202.
Office Action from U.S. Appl. No. 16/257,479, dated Aug. 3, 2020.
Office Action from U.S. Appl. No. 16/257,479, dated Sep. 10, 2020.
Office Action from U.S. Appl. No. 16/257,424, dated Sep. 22, 2022.
Office Action from U.S. Appl. No. 17/301,543, dated Oct. 5, 2022.
Office Action from U.S. Appl. No. 17/301,543, dated Nov. 2, 2022.
Structural Analysis and Shape Descriptors—OpenCV 2.4.13.7 documentation, https://docs.opencv.org/2.4/modules/imgproc/doc/structural_analysis_and_shape_descriptors.html?highlight=findcontours#int%20cvFindContours(CvArr*%20image,%20CvMemStorage*%20storage,%20CvSeq**%20first_contour,%20int%20header_size,%20int%20mode,%20int%20method,%20CvPoint%20offset), retrieved Feb. 19, 2019.
The Spatial Filtering Process, http://image.slidesharecdn.com/5spatialfilteringp1-120317081240-phpapp02/95/5-spatial-filtering-p1-5-728.jpg?cb=1331973416, retrieved Feb. 19, 2019.
Suzuki et al., "Topological structural analysis of digitized binary images by border following," https://www.sciencedirect.com/science/article/pii/0734189X85900167?via%3Dihub, retrieved Feb. 19, 2019.

METHODS AND SYSTEMS FOR DETERMINING ACCURACY OF SPORT-RELATED INFORMATION EXTRACTED FROM DIGITAL VIDEO FRAMES

CROSS REFERENCE TO RELATED APPLICATION

This is a continuation of U.S. patent application Ser. No. 17/364,349, filed on Jun. 30, 2021, which is a continuation of U.S. patent application Ser. No. 16/257,479, filed on Jan. 25, 2019, the entirety of each of which is hereby incorporated by reference in its entirety.

BACKGROUND

A typical media client operates to receive an analog or digital media stream representing media content such as video content and to output the media content and/or forward the stream for presentation of the content on a user interface such as a display screen. Examples of such clients include televisions, computer monitors, projection systems, set top boxes (e.g. cable or satellite TV receivers), digital video recorders, personal computers, gaming consoles, streaming media players, and the like.

By way of example, the media client could be a television, which could receive a media stream (e.g., an over the air broadcast stream, a media stream output from a set top box, a media stream played from a digital storage medium, an Internet stream, or another such stream) and could present the media content of that stream to a user. As another example, the media client could be a set top box or digital video recorder, which could receive a broadcast stream from a multi-channel video program distributor and/or from data storage and could output the media content of that stream via a High-Definition Multimedia Interface (HDMI) cable or other interface to a television and/or video receiver for playout. Numerous other examples are possible as well.

SUMMARY

In practice, a media stream could be a video feed including a time sequence of digital video frames. Each digital video frame of the sequence could be an image depicting various image elements. And the digital video frames of the video feed could cooperatively depict certain media content, such as sport-related content. For example, a media client could receive a real-time video feed including a time sequence of digital video frames that cooperatively depict a sport event, and the media client could present the depicted sport event to a user substantially in real-time while receiving the video feed. Examples of sport events include, without limitation, a basketball game, a baseball game, a football game, a soccer game, a hockey game, a tennis game, or a volleyball game, among many other possibilities.

Generally, the depiction of the sport-related content could include information about the sport event. For example, one or more of the video frames could depict a scoreboard presenting information about the sport event. Examples of such information include, without limitation, (i) team or player name(s), (ii) score information such as a number of points, goals, runs or the like per team or player, and (iii) game time information such as a game clock and/or a shot clock indicating time remaining and/or elapsed in accordance with rules of the sport event.

For various reasons, it may be useful to gather information about the sport event. For example, it may be useful to make information about the sport event available on the Internet in real-time as the event is happening, so that users can view the information with a web browser or the like, to keep track of the sport event or for other purposes. Further, it may be useful to dynamically modify the media stream based on information about the sport event, such as by inserting into the media stream an advertisement, a highlight reel, and/or other content selected based on the information, to help enhance a viewer's experience. Other examples are also possible.

One way to gather information about a sport event depicted by a media stream is to have one or more people watch the broadcast and manually record information about the event, such as by taking notes on paper and/or entering the information into a computing system such as a database. However, this approach could be time consuming, costly, and/or error-prone, and is therefore undesirable.

Another way to gather such information is to have a computing system automatically analyze one or more frames of the media stream and work to extract the information from text depicted in those frames. For instance, the computing system could apply optical-character-recognition (OCR) to a video frame of the media stream, in an effort to recognize various characters depicted by the frame, and the computing system could work to determine the sport-related information based on the recognized characters.

Unfortunately, however, that OCR process could result in recognizing numerous characters unrelated to the desired information about the sport event. For instance, for a sport event played in a stadium, the process might result in recognizing text displayed on banner advertisements within the stadium, text on spectators' clothing, and the like. As a result, the computing system might then need to apply additional processes in an effort to extract the desired sport-related information based on the results of the OCR process. Yet applying such additional processes could be inefficient, computationally expensive, and error-prone. Consequently, an improvement is desired.

Disclosed herein is an improved approach for automatic extraction of sport-related information. In accordance with the disclosed approach, a computing system such as a media client or other device could automatically analyze two or more video frames of the media stream in order to identify a frame region that depicts a scoreboard, based on the identified region having one or more characteristics associated with a scoreboard. The computing system could then analyze a video frame of the media stream to detect, within the identified scoreboard frame region, one or more sub-regions that depict text of the scoreboard and could analyze the identified sub-region(s) to recognize text. And the computing system could then generate sport-related data based on the recognized text.

The disclosed approach could thereby enable the computing system to focus its recognition of characters on one or more specifically relevant frame regions and to generate sport data based on those recognized characters. As a result, the approach could help overcome some of the above-described deficiencies and could provide other advantages.

In an example implementation, the computing system could recognize the scoreboard frame region based on the static (unchanging) depiction of certain scoreboard image elements, as compared with the more dynamic (changing) depiction of other image elements within the video frames.

For example, the scoreboard is likely to be depicted in the same location across many of the video frames, such as at a corner or edge of each of a series of video frames. Further, graphical elements of the scoreboard, such as design features defining a border or other fixed aspects of the scoreboard, as well as depictions of team names and/or logos, are likely to remain static across many frames. And still further, the scoreboard depiction of score and/or time is likely to remain the same across at least some of the frames over short periods of time.

In contrast, the dynamic nature of the sport event might cause other depicted image elements to frequently change across the video frames. For example, one video frame might depict an individual (e.g., a participant in the sport event) at one location, and a next video frame might depict that individual at another location. Further, one video frame might depict one camera view of the sport event and another video frame might depict a different camera view of the sport event. Other examples are also possible.

Leveraging these assumptions, the computing system could work to detect the scoreboard region by detecting a set of image elements that are unchanging across a group of frames in the sequence, such as across a group of frames that are adjacent to each other or are otherwise close to each other in time. For instance, the computing system could engage in an edge-detection process to detect image-element edges respectively in each frame of the group. And the computing system could then identify a subset of the detected edges based on each edge of the subset being unchanging across the frames of the group. Because the edges of the subset are those that do not change across the frames of the group, the computing system could then conclude that the edges of the subset are likely edges of the scoreboard image elements rather than edges of other (non-scoreboard) image elements. On at least this basis, the computing system could thus deem a frame region that encompasses the edges of the subset to be the scoreboard frame region.

After detecting the scoreboard frame region, the computing system could then engage in another procedure to detect, within the scoreboard frame region, one or more sub-regions that depict text of the scoreboard. In an example implementation, text of the scoreboard could include a team name, a score, and/or a game clock, among other textual expressions, and each detected sub-region could respectively depict one of those textual expressions. Further, the computing system could carry out this sub-region analysis with respect to one or more of the frames that the computing system used as a basis to detect the scoreboard region, or the computing system could carry out the sub-region analysis with respect to one or more other frames of the video sequence.

The computing system could detect a given sub-region by leveraging an assumption that a given textual expression likely consists of two or more proximate alphanumeric characters. Specifically, each character in the textual expression may have a respective outline that defines an alphanumeric shape. So the computing system could identify a frame region encompassing two or more such alphanumeric shapes that are close to one another, and the computing system could deem that region to be one of the sub-regions.

To facilitate this, the computing system could engage in an additional edge-detection process to detect edges of scoreboard image elements within the scoreboard frame region of one of the video frames. This additional edge-detection process could be the same edge-detection process that the computing system used for detecting the scoreboard frame region, or it could be a different edge-detection process. In either case, through this additional edge-detection, the computing system could generate a binary image that depicts various detected edges of scoreboard image elements, including edges of alphanumeric characters as well as other edges.

After or during the additional edge-detection, the computing system could apply pattern-recognition to determine which of the detected edges define alphanumeric shapes and are thus edges of alphanumeric characters. In this pattern-recognition, the computing system could apply a contouring procedure on the binary image to identify edge(s) that enclose an area of the binary image, and the computing system could then determine whether the enclosed area has an alphanumeric characteristic, based on one or more factors, such as an aspect ratio of the enclosed area. If the computing system determines that the enclosed area has an alphanumeric characteristic, the computing system could then conclude that the identified edge(s) (i.e., the edge(s) that enclose the area) define a given one of the alphanumeric shapes.

Once the computing system identifies the alphanumeric shapes, the computing system could then identify one of the sub-regions as a frame region that encompasses proximate alphanumeric shapes from among the identified alphanumeric shapes. In this process, the computing system could establish minimum bounding rectangles each bounding a respective one of the identified alphanumeric shapes. A minimum bounding rectangle can encompass the maximum extents of an image element, and thus each established minimum bounding rectangle can respectively encompass the maximum extents of one of the identified alphanumeric shapes. Further, the computing system can use at least some of the established minimum bounding rectangles as basis to establish a composite shape that effectively covers proximate alphanumeric shapes and thus effectively covers characters of a textual expression of the scoreboard. Given that the composite shape might cover the textual expression, the computing system can use the composite shape as basis to determine the sub-region that depicts the textual expression.

In an example implementation of this process, the computing system can update the binary image such that each minimum bounding rectangle covers a respective one of the identified alphanumeric shapes, and the computing system can then extend each minimum bounding rectangle. In practice, extending a given minimum bounding rectangle may involve further updating the binary image to add a predetermined number of pixels alongside pixels of the given minimum bounding rectangle. And because a textual expression is likely depicted along a horizontal axis of the video frame, the computing system may add these pixels along the horizontal axis (e.g., add 6 pixels in one direction along the horizontal axis and 6 pixels in the other direction along the horizontal axis). As a result, if two or more of the minimum bounding rectangles are sufficiently close to one another (e.g., 12 pixels apart or less), then the extending may effectively merge together these minimum bounding rectangles into a composite shape, such as into a composite rectangle encompassing these minimum bounding rectangles and thus effectively covering the textual expression.

Once the computing system establishes the composite shape, the computing system can then use the composite shape as basis to determine the sub-region. For instance, the composite shape might occupy a particular region of the updated binary image, and the computing system may apply a connected component labeling (CCL) procedure to identify the particular region. This particular region of the binary image may correspond to a particular region of the video frame, and thus the computing system may deem that particular region of the video frame to be the sub-region. Other examples are also possible.

Once the computing system detects the sub-regions that depict text of the scoreboard, the computing system could recognize text specifically in one or more of these sub-regions within any given video frame of the sequence, and the computing system could generate sport data based on the recognized text. The generated sport data may indicate team name(s), score(s), and/or a game time associated with the sport event, among other possibilities.

Generally, the computing system could determine team names and their corresponding scores by analyzing text in sub-regions that are arranged according to how those team names and scores might be arranged on a scoreboard.

Specifically, the computing system could have access to information indicating candidate geometric arrangements of sub-regions, each candidate geometric arrangement corresponding to one of several possible arrangements of team names and scores on a scoreboard. For example, a first team name, a second team name, a first score, and a second score might be arranged according to a rectangular arrangement. For instance, a video frame might depict the first team name alongside the first score, so as indicate the number of points, goals, runs etc. achieved by that first team. Similarly, the video frame might depict the second team name alongside the second score, so as indicate the number of points, goals, runs etc. achieved by that second team. Moreover, the video frame might depict the second team name and the second score beneath the first team name and the first score, thereby resulting in the rectangular arrangement. As such, at least one of the candidate geometric arrangements could correspond to such a rectangular arrangement. Other examples are also possible.

Leveraging these assumptions, the computing system could work to recognize text in just select sub-regions and could then detect scoreboard information based on the recognized text. For instance, the computing system could select a set of frame regions, from among the detected sub-regions, based on the frame regions of the selected set cooperatively having a geometric arrangement that corresponds with one of the candidate geometric arrangements. Then, the computing system could apply OCR to recognize characters within each of the frame regions of the selected set. And the computing system could use those recognized characters to detect scoreboard information, such as by detecting the first team name based on the recognized characters in a first frame region of the selected set, the second team name based on the recognized characters in a second frame region of the selected set, the first score based on the recognized characters in a third frame region of the selected set, and the second score based on the recognized characters in a fourth frame region of the selected set.

Furthermore, as noted above, the computing system could additionally or alternatively extract sport data that indicates a game time. To do so, the computing system could (i) recognize characters within one of the sub-regions, (ii) determine that those recognized characters are arranged according to a predetermined pattern (e.g., a regular expression), and (iii) determine the time based on the recognized characters and according to the predetermined pattern. By way of example, the computing system might recognize the digit "1", followed by a colon, followed by the digit "2", and then followed by the digit "3". In this example, based on the recognized characters and the pattern according to which those characters are arranged, the computing system could extract a game clock of "1:23", which is a game time associated with the sport event. Other examples are also possible.

In addition, once the computing system extracts sport data from a sequence of video frames, the computing system could (i) determine whether the extracted sport data is accurate and (ii) take a certain action based on whether the computing system deems the extracted sport data to be accurate. The computing system could do so in various ways.

By way of example, the sport data might specify an attribute (e.g., a score or a time) that changes over the sequence and thus the computing system could determine accuracy of the sport data by evaluating whether the attribute changes as expected. Specifically, the computing system could use the extracted sport data as basis to detect a pattern of change of the attribute over the sequence, and the computing system could then determine whether the detected pattern corresponds to how the attribute is expected to change during the sport event. If the computing system determines that the detected pattern is as expected, then the computing system can carry out an action that corresponds to the extracted sport data being accurate, such as by modifying a media stream in real-time as described, for instance. However, if the computing system determines that the detected pattern is not as expected, then the computing system can carry out an action that corresponds to the extracted sport data being inaccurate, such as by again attempting extraction of sport data, for instance. Other examples are also possible.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
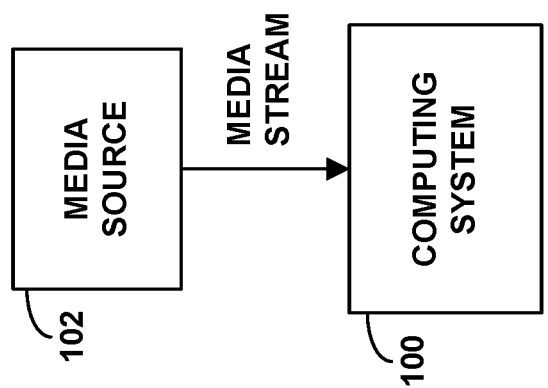
FIG. 1 is a simplified block diagram of an example arrangement in which disclosed features can be implemented.

Referring to the drawings, FIG. 1 is a simplified block diagram of an example arrangement in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that operations described herein as being carried out by one or more entities could be implemented by and/or on behalf of those entities, through hardware, firmware, and/or software, such as by one or more processing units executing program instructions or the like.

As shown in FIG. 1, the example arrangement includes a computing system 100 configured to receive a media stream in real-time from a media source 102. In line with the discussion above, the media stream could be an analog or digital media stream representing media content, such as video content. Also, the computing system 100 could take various forms, so as to help facilitate the various aspects of the present disclosure.

In one implementation, the computing system 100 might be a server or the like that is configured to analyze the media steam, but not necessarily configured to output the media content. Specifically, the computing system 100 may or may not have a user interface and thus may or may be configured to output the media content for presentation of the content on a user interface. However, the computing system 100 could have a communication interface with a network (e.g., the Internet or a private network) through which the computing system 100 can engage in communication with a media client. Given this, the media client could receive the media stream from the media source 102 and/or from the computing system 100, and the media client could then output the media content for presentation of the content on a user interface.

In another implementation, the computing system 100 could be included in or integrated with a media client, and thus the computing system 100 might be configured both to analyze the media steam and to output media content. For example, the computing system 100 could be a media client that takes any of the forms described above and that is configured to operate as described above, so as to receive the media stream from the media source 102 and to output the media content and/or forward the stream for presentation of the content on a user interface. Other implementations are also possible.

Furthermore, the media source 102 could also take various forms, possibly depending on the form of the computing system 100. By way of example, the media source 102 could be a local set top box (e.g., cable or satellite receiver) or a streaming media server, configured to output a selected media stream for presentation by a television, or the media source 102 could be a broadcast television station or the like, among other possibilities. In another example, the media source 102 may comprise an Internet streaming media server or other media provider accessible by the computing system 100. In yet another example, the media source 102 could be data storage integrated with and/or accessible locally by the computing system 100. Other examples are possible as well.

In line with the discussion above, the media stream could include a time sequence of a plurality of digital video frames, and the media stream could be, for example, a video feed (e.g., a real-time broadcast feed) including this time sequence.

In practice, a digital video frame can define a coordinate system, such as one having a horizontal axis (e.g., x-axis) and a vertical axis (e.g., y-axis), and image elements depicted by the digital video frame may have respective locations in that coordinate system. Specifically, the digital video frame can include a plurality of pixels that collectively represent the image elements, and each such pixel might be at respective coordinates within the coordinate system. Thus, a set of pixels that represent a particular image element might be at certain coordinates, and those coordinates may define the location of that image element within the digital video frame.

Moreover, each digital video frame of the plurality might define the same coordinate system, and thus depicted image elements could have the same and/or different respective locations across these frames. For example, a first digital video frame could depict a particular image element (e.g. a person) in a certain location in the coordinate system, and a second digital video frame could also depict the particular image element at the same location in the coordinate system. In another example, however, a first digital video frame could depict a particular image element in a certain location in the coordinate system, and a second digital video frame could depict the particular image element at a different location in the coordinate system. Other examples are also possible.

In this arrangement, the computing system 100 could carry out the disclosed approach for automatic extraction of sport-related information. According to the disclosed approach, the computing system 100 can engage in digital image processing of digital video frames that depict a sport event, so as to automatically generate sport data that indicates a game score (e.g., team names and their corresponding scores) and/or a game time associated with the sport event. And as discussed above, this disclosed approach could advantageously enable the computing system 100 to focus its recognition of characters on one or more specifically relevant frame regions and to generate sport data based on those recognized characters.

Generally, the computing system 100 could engage in the digital image processing in response to one or more triggers. In some cases, such trigger(s) could cause the computing system 100 to engage in the digital image processing in real-time, such as while receiving a real-time broadcast feed including the digital video frames. In other cases, the trigger(s) could cause the computing system 100 to engage in the digital image processing at other time(s) and not necessarily in real-time.

One possible trigger could be a user request to engage in the digital image processing. Specifically, the computing system 100 could receive a request to engage in the digital image processing of the digital video frames that depict the sport event, and the computing system could respond to the received request by engaging in this digital image processing accordingly. To facilitate this, a GUI could include a graphical feature that is selectable to submit the request. In some cases, the computing system 100 could be configured to display this GUI via a display screen. In other cases, a separate computing device could display this GUI, and the computing system 100 could receive the request from that computing device, such as upon submission of the request. In either case, the GUI could, for example, include a listing of various events being broadcast in real-time as well as a graphical feature that allows a user to select one of these events, so as to cause the computing system 100 to apply the digital image processing to video frames that depict the selected event.

Additionally or alternatively, the computing system 100 could use electronic program guide (EPG) data as basis to trigger the digital image processing at issue.

EPG data could include information about current and/or upcoming broadcast programming. Such information might indicate the types of event(s) that are being broadcast and/or times at which certain event(s) are respectively scheduled to be broadcasted, among other possibilities. In practice, the computing system 100 could obtain such EPG data from server(s) of a broadcast television station and/or from an Internet streaming media server, among other options. For example, the computing system 100 could have a communication interface with a network through which the computing system 100 can obtain EPG data from such server(s). Moreover, the computing system 100 could obtain EPG data at any feasible time. For instance, every time that server(s) of a broadcast television station are updated to include new EPG data indicating newly scheduled events, those server(s) could automatically transmit the new EPG data to the computing system 100.

Given this, the computing system 100 could use the information indicated by the EPG data as basis to trigger the digital image processing. For example, assuming that the media stream is a particular broadcast feed, the computing system 100 could use the event types indicated by the EPG data as basis to make a determination that the particular broadcast feed is associated with the sport event, and the computing system 100 could trigger the digital image processing in response to making this determination. In another example, the computing system 100 could use the EPG data as a basis to determine a particular time associated with scheduling of the particular broadcast feed, such as a time that a broadcast television station is scheduled to begin broadcasting of the particular broadcast feed, for instance. And the computing system 100 could responsively trigger the digital image processing at that particular time, so as to engage in the digital image processing in real-time, for instance. Other examples are also possible.

In line with the discussion above, the digital image processing could include several steps. In a first step of the digital image processing, the computing system 100 can identify a frame region of the digital video frames based on this frame region depicting a scoreboard. In a second step of the digital image processing, the computing system 100 can execute a procedure to detect, within the identified scoreboard frame region, one or more frame regions that depict text of the scoreboard. In a third step of the digital image processing, the computing system 100 can apply OCR to recognize the text in one or more of the frame regions that depict text of the scoreboard. And in a fourth step of the digital image processing, the computing system 100 can generate sport data based on the recognizing of the text.

According to the present disclosure, the computing system 100 could carry out the first step in various ways. One implementation could involve the computing system 100 automatically identifying the scoreboard frame region based on the static (unchanging) depiction of certain scoreboard image elements as described. This implementation is described below in more detail.

In an alternative implementation, however, the computing system 100 could receive input indicating the scoreboard frame region. Specifically, the computing system 100 could (i) receive information indicating the scoreboard frame region and (ii) identify the scoreboard frame region based on this received information. The computing system 100 could facilitate this in various ways.

In one example, a GUI could visually represent one of the digital video frames and could include an interface feature that enables designation of the scoreboard frame region within the visual representation of the digital video frame. In one case, the computing system 100 could be configured to display this GUI via a display screen, and thus the computing system 100 could use this designation as basis for identifying the scoreboard frame region. In another case, a separate computing device could display this GUI, and the computing system 100 could (i) receive from that computing device information indicating the designation and (ii) identify the scoreboard frame region based on the designation indicated by the received information. In either case, the designation may represent the scoreboard frame region as occupying particular coordinates of the digital video frame, and thus the computing system 100 could record an indication that these particular coordinates represent the scoreboard frame region.

In another example, a machine learning (ML) model could output information indicating a scoreboard frame region. In particular, the computing system 100 or another device could run ML software or the like, which executes algorithms that learn from and make predictions on data. The computing system 100 or other device could run the ML software to generate an ML model based on training data. The training data can indicate scoreboard frame region(s) respectively in video frame(s), each video frame respectively depicting a sport event for a particular type of sport (e.g., soccer). In turn, if the computing system 100 (i) receives video frames that depict an event for a sport of that particular type and (ii) does not yet have information about a scoreboard frame region for those video frames, the computing system 100 could apply the ML model on those video frames to generate information indicating the scoreboard frame region at issue. Additionally or alternatively, the other device could apply the ML model on those video frames, and the computing system 100 could receive, from the other device, information indicating the scoreboard frame region for those video frames. In either case, the computing system 100 could identify the scoreboard frame region based on the information outputted by the ML model. Other examples are also possible.

Regardless of how the computing system 100 identifies the scoreboard frame region, after the computing system 100 completes the first step, the computing system 100 could then carry out the remaining steps of the digital image processing as described. These remaining steps are also described below in more detail.

Once the computing system 100 completes the digital image processing, the computing system 100 can then carry out an action based on the generated sport data.

In one example, the computing system 100 could store the generated sport data in a data storage device, such as in a data storage device of the computing system 100 and/or in another data storage device. In this way, the computing system 100 could make the generated sport data accessible for use by the computing system 100 and/or by other devices.

In another example, the computing system 100 could cause presentation of the information indicated by the generated sport data. For instance, the computing system 100 could present this information on a display screen of the computing system 100 and/or could transmit the generated sport data to another device, so that this device could present this information on a display screen of the device.

In yet another example, the computing system 100 could output a report related to the generated sport data. For instance, the computing system 100 could present this report on a display screen and/or could cause a printer device to print the report, among other options. In any case, the report could indicate the various frame regions that were identified and/or whether the sport data is accurate, among numerous other options.

In yet another example, the computing system 100 could update information in user-account based on the generated sport data. For instance, an individual could set up a user-account on a website to provide sport-related statistics for select sport teams in real-time. Given this, the computing system 100 could determine that the generated sport data indicates a particular score for one of those select sport teams, and could responsively update the user-account in real-time to provide that particular score. As a result, the individual could log into this user-account to view that particular score in real-time via the website.

In yet another example, the computing system 100 could cause presentation of supplemental content based on the generated sport data. For instance, the computing system 100 could modify in real-time the media stream including the digital video frames at issue, such as by inserting into the media steam an advertisement, a highlight reel, and/or other content that is based on the generated sport data. In a specific example, the computing system 100 could determine that the sport data indicates a score for a particular team and could modify the media stream by inserting into the media stream an advertisement for that particular team. The computing system could then forward this modified portion for presentation on a media client. In another instance, the computing system 100 (i) could determine replacement content (e.g., an advertisement, a highlight reel, and/or other content) based on the generated sport data and (ii) could send the replacement content to a media client along with a directive for the media client to play out the replacement content in place of certain other content of the media stream. Other examples are also possible.

Figure 2:
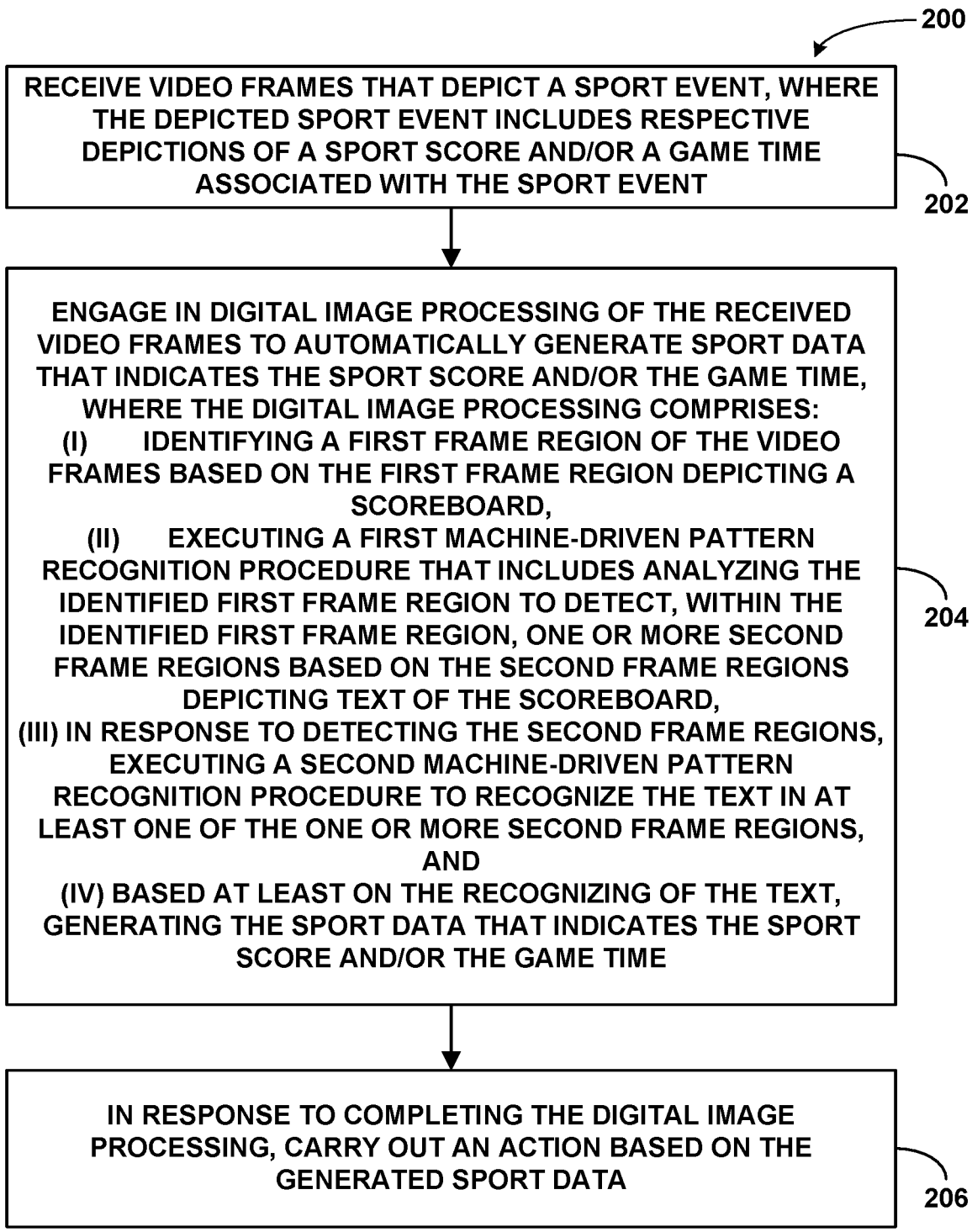
FIG. 2 is a flow chart depicting a method that could be carried out in accordance with the disclosure.

FIG. 2 is next a flowchart illustrating a method 200 that can be carried out in accordance with this disclosure. Illustrative methods, such as method 200, could be carried out in whole or in part by component(s) and/or arrangement(s) in a computing system. However, it should be understood that example methods, such as method 200, could be carried out by other entities or combinations of entities as well as in other arrangements, without departing from the scope of the disclosure.

As shown by block 202 in FIG. 2, the method 200 involves, receiving video frames that depict a sport event, where the depiction of the sport event includes respective depictions of a sport score and/or a game time associated with the sport event. At block 204, method 200 then involves, engaging in digital image processing of the received video frames to automatically generate sport data that indicates the sport score and/or the game time. This digital image processing includes (i) identifying a first frame region of the video frames based on the first frame region depicting a scoreboard, (ii) executing a first machine-driven pattern recognition procedure that includes analyzing the identified first frame region to detect, within the identified first frame region, one or more second frame regions based on the second frame regions depicting text of the scoreboard, (iii) in response to detecting the second frame regions, executing a second machine-driven pattern recognition procedure to recognize the text in at least one of the one or more second frame regions, and (iv) based at least on the recognizing of the text, generating the sport data that indicates the sport score and/or the game time. And at block 206, method 200 then involves, in response to completing the digital image processing, carrying out an action based on the generated sport data.

I. Automatically Detecting a Video Frame Region that Depicts a Scoreboard

As noted above, the present disclosure provides a technique for automatically detecting, in a sequence of digital video frames, a video frame region that depicts a scoreboard. The computing system 100 could carry out this technique as part of the above-described digital image processing. And once the computing system 100 carries out this technique, the computing system 100 could have information about where a scoreboard might be depicted in any given one of the plurality of digital video frames included in the media stream.

In line with the discussion above, this technique could involve the computing system 100 detecting the scoreboard frame region based on the unchanging depiction of certain scoreboard image elements over the course the video frames of the sequence. Specifically, the computing system 100 could detect a set of image elements that are unchanging across the video frames in the sequence, such as by (i) engaging in an edge-detection process to detect image-element edges respectively in each frame of the sequence and (ii) identifying a subset of the detected edges based on each edge of the subset being unchanging across the frames of the sequence. The computing system 100 can then deem a frame region that encompasses the edges of the subset to be the scoreboard frame region.

To facilitate detection of the scoreboard frame region in a sequence of digital video frames, the computing system 100 could first select, from among the plurality of digital video frames of the media stream, a group of digital video frames to define the sequence that will be the subject of this analysis. The computing system 100 could select this sequence of digital video frames based on one or more factors.

In an example implementation, the computing system 100 could select a certain quantity of digital video frames to be the sequence of digital video frames at issue. This quantity could be predetermined or could depend on the sport event being depicted by the digital video frames, among other possibilities.

For instance, the computing system 100 can be preconfigured (by engineering input or the like) to select a predetermined quantity of digital video frames to be the sequence of digital video frames at issue. And the predetermined quantity could be any quantity that would help enable the computing system 100 to successfully carry out the technique at issue. For example, the predetermined quantity could be two or more.

Alternatively, the computing system 100 could select a particular quantity of digital video frames as the sequence, with the particular quantity being based on the sport event being depicted. In practice, scoreboards associated with certain sport events might include more image element(s) than scoreboard associated with other sport events. (For instance, a score depicted for a baseball game may include more digits than the number of digits included in a score depicted for a soccer game). Given this, computing system 100 could select a greater quantity of video frames when the depicted sport event has a scoreboard that tends to include more image elements than others, as applying the analysis across a greater quantity of video frames might help increase the likelihood of the computing system 100 successfully detecting the scoreboard frame region. Whereas, computing system 100 could select fewer video frames when the depicted sport event has a scoreboard that tends to include fewer image elements than others, as such a quantity might still be sufficient to enable the computing system 100 to successfully detect the scoreboard frame region.

Accordingly, the computing system 100 could determine the sport event depicted by the plurality of digital video frames and, based on the determined sport event, the computing system 100 could then determine a quantity of video frames to use as basis for automatically detecting the scoreboard frame region. And the computing system 100 could then select, from among the plurality of digital video frames, the sequence based on the selected sequence including the determined quantity of video frames.

To facilitate this, the computing system 100 could determine the depicted sport event based on the above-described EPG data, among other options. For example, the EPG data could indicate event information for a broadcast feed that includes the plurality of digital video frames, and the computing system 100 could use the indicated event information as basis to determine that this broadcast feed is associated with a particular sport event.

Further, the computing system 100 may have access to mapping data that maps a plurality of sport events each to a respective quantity of video frames, and could thus use this mapping data to select the particular quantity of video frames to be included in the sequence. For example, the mapping data might map a soccer game to three video frames and a baseball game to six video frames. As a result, if the computing system 100 determines, for instance, that a soccer game is being depicted by the plurality of digital video frames, then the computing system 100 could select the sequence based on the selected sequence including three digital video frames from among the plurality. Other examples are also possible.

In this implementation, the computing system 100 could use various approaches to select the video frames to be included in the sequence.

In one case, the computing system 100 could select consecutive video frames from among the plurality of video frames. For example, the computing system 100 could select a first video frame and then a second video frame that is the next frame in time following the first video frame, and so on.

In another case, the computing system 100 could select one in every N video frames starting at a given (e.g., arbitrary) video frame of the plurality and ending once a certain quantity of video frames is selected, with N being a predetermined number that allows the video frames of the sequence to be spaced apart from each other enough to help support the analysis.

In yet another case, the computing system 100 could arbitrarily select video frames from among the plurality. For instance, as long as each selected video frame happens to depict the scoreboard, then such arbitrary selection would still enable the computing system 100 to identify scoreboard image elements that are unchanging across these selected video frames and to thus carry out the disclosed scoreboard region detection, even if the selected video frames are not threshold close to one another. Other cases are also possible.

As noted above, the technique at issue could involve the computing system 100 engaging in an edge-detection process to detect a set of edges of image elements depicted by the digital video frames of the sequence.

An edge is a set of contiguous points at which an image attribute changes significantly (e.g., points at which an abrupt change in color or brightness occurs). Such points may represent a boundary of an image element depicted in the image, and thus the computing system 100 could engage in an edge-detection process so as to determine boundaries of image elements depicted by the digital video frame. Examples of edge-detection processes include Canny edge detection, Sobel edge detection, and Prewitt edge detection, among others.

In some implementations, an output of the edge-detection process could be a binary image (also referred to as a binary representation) representing the detected edges of image elements depicted by a digital video frame. The binary image may consist of foreground pixels each having a first value (e.g., representing a white color) and of background pixels each having a second value (e.g., representing a black color). Also, the binary image could define the same coordinate system that the digital video frame defines, and thus each pixel in the binary image may have respective coordinates that match corresponding coordinates of one of the pixels in the digital video frame. Thus, the binary image could include foreground pixels at respective coordinates that correspond to coordinates of edges detected in the digital video frame, so that the foreground pixels represent the detected edges.

Given this, as a result of engaging in the edge-detection process to detect the set of edges, the computing system 100 could generate respective binary representations of edges of the set. For example, computing system 100 could generate a first binary representation of first edges detected in a first video frame of the sequence and could generate a second binary representation of second edges detected in a second video frame of the sequence, and so on. Thus, the generated binary representations can collectively represent the edges of the set.

In some implementations, the computing system 100 could disregard certain frame region(s) during the edge-detection process, as some frame region(s) may be less likely than others to depict image elements of the scoreboard. This could help reduce consumption of processing resources by the computing system 100, among other advantages.

More specifically, the computing system 100 could exclude, from the edge-detection process, detection of edges in a predefined frame region of the video frames and could thus detect the set of edges within region(s) other than the predefined frame region. To facilitate this, the computing system 100 could have access to region-information indicating predefined frame region(s) that are not candidate(s) for depicting the scoreboard, and the computing system 100 could use this region-information as basis for the excluding. In practice, the region-information can be established by engineering input or the like and can indicate a predefined frame region in various ways, such as according to a set of coordinates in the coordinate system defined by the video frames. Thus, the predefined frame region(s) could take various forms.

By way of example, the video frames may be less likely to depict the scoreboard in a center portion of the video frames, as such depiction would likely obstruct presentation of other aspects of the sport event. The computing system 100 could define this center portion as a rectangular region having corners that are substantially equidistant from corresponding corners of the video frames. Thus, the computing system 100 could disregard this center frame region during the edge-detection process. Other examples are also possible.

After or during the edge-detection process, as noted above, the computing system 100 could identify a subset of the detected set of edges based on each edge of the subset being unchanging across the video frames of the sequence. As discussed above, because the edges of the subset are those that don't change across the video frames of the sequence, those edges are more likely to be edges of scoreboard image elements rather than of other image elements.

To facilitate this, the computing system 100 could apply a logical conjunction on the set to produce an output indicating which of the detected edges of the set are commonly found across the video frames of the sequence, and the computing system 100 could deem those common edges to be edges of the subset. Applying a logical conjunction is also known as applying an AND-operator, an AND operation, ANDing, or the like.

By way of example, the computing system 100 could generate first and second binary representations with respect to first and second respective video frames as discussed above, and the computing system 100 could apply the logical conjunction on those binary representations so as to output a third binary representation of edges that are common to the first and second binary representations. In doing so, the computing system 100 could apply the logical conjunction on all coordinates of the coordinate system defined by the first and second binary representations, so as to output the third binary representation. For instance, the computing system 100 could apply the logical conjunction on particular coordinates. If the first and second binary representations both respectively represent a detected edge at the particular coordinates, then the third binary representation would include foreground pixel(s) at those coordinates, so as to represent a common edge at those coordinates. But if the first and/or second representations do not respectively represent a detected edge at the particular coordinates, then the third binary representation would include background pixel(s) at those coordinates.

Further, the computing system 100 could apply such a logical conjunction on two or more binary representations defined with respect to two or more respective video frames, so as to generate another binary representation of edges that are common to those two or more binary representations and thus to the group of video frames. Other examples are also possible.

Once the computing system 100 identifies the subset of edges, the computing system 100 could then work to detect the scoreboard frame region in various ways.

In one implementation, the edges of the identified subset might occupy particular coordinates within the coordinate system of the video frames, and thus the computing system 100 could deem those particular coordinates to represent the scoreboard frame region.

In another implementation, the computing system 100 could establish a minimum bounding rectangle that bounds the edges of the identified subset of edges, and the computing system 100 could determine the scoreboard frame region based on the established minimum bounding rectangle.

A minimum bounding rectangle encompasses the maximum extents of an image element. For instance, the image element could have minimum and maximum x-coordinates along an x-axis of an image as well as minimum and maximum y-coordinates along a y-axis of the image, and thus the minimum bounding rectangle could span from the minimum x-coordinate to the maximum x-coordinate as well as from the minimum y-coordinate to the maximum y-coordinate. As such, the established minimum bounding rectangle can occupy particular coordinates within the coordinate system of the video frames, so as to encompass the maximum extents of the edges of the identified subset. And the computing system 100 could deem those particular coordinates to represent the scoreboard frame region.

In yet another implementation, the computing system 100 could carry out a filtering process after identifying the subset and could detect the scoreboard frame region following completion of the filtering process. The filtering process could work to filter out from the subset one or more edges that were included in the subset as a result of being unchanging across video frames of the sequence but that are nevertheless unlikely to be edges of scoreboard image elements. Additionally or alternatively, the filtering process could work to filter out other image artifacts that might inadvertently be included in the binary representation of edges of the subset. The filtering process could do so in various ways.

For example, the filtering process could leverage certain assumptions about the density of foreground pixels throughout the binary representation of edges of the subset. In practice, certain region(s) of the binary representation may include higher respective densities of foreground pixels compared to other region(s) of the binary representation. And given that scoreboard image elements may include elements such as border(s), text, and/or logo(s), foreground pixels in the higher density region(s) of the binary representation are more likely to represent edges of the scoreboard image elements. Thus, the filtering process could identify, in the binary representation, region(s) that include lower respective densities of foreground pixels and could work to filter out foreground pixels from those identified regions of the binary representation. In turn, an output of the filtering process could be an updated binary representation including a plurality of foreground pixels and the computing system 100 could deem those foreground pixels to be the actual edges of the scoreboard image elements.

To facilitate this, the filtering process could involve application of a density filter followed by application of a thresholding operation.

In particular, the computing system 100 could apply a density filter (also known as a spatial filter) to the binary representation of edges of the subset. By applying the density filter, the computing system 100 could generate a grayscale image that includes a plurality of pixels each having a respective non-binary value (e.g., a value from among a range of values each respectively representing a color or intensity). Some region(s) of the grayscale image may include pixels that have higher respective values, and those region(s) may correspond to the above-mentioned higher density region(s) of the binary representation. Whereas, other region(s) of the grayscale image may include pixels that have lower respective values, and those region(s) may correspond to lower density region(s) of the binary representation. Thus, application of the density filter can produce a grayscale image that effectively emphasizes higher density region(s) of the binary representation by way of higher-value pixels.

Once the computing system 100 applies the density filter, the computing system 100 could then apply a thresholding operation with respect to the generated grayscale image. As part of the thresholding operation, the computing system 100 could recognize higher-value pixels of the grayscale image, as those pixels are more likely to represent scoreboard image elements in line with the discussion above. To do so, the computing system 100 could recognize pixels, from among the plurality of pixels of the grayscale image, based on the recognized pixels having respective values that are higher than a predefined threshold value. In turn, the computing system 100 could generate an updated binary representation that includes foreground pixels at respective locations that correspond to respective locations of the recognized pixels in the generated grayscale image. As discussed, the computing system 100 could deem those foreground pixels to be the actual edges of the scoreboard image elements. Other filtering processes are possible as well.

Once computing system 100 completes the filtering process, computing system 100 could then use the identified actual edges as basis to detect the scoreboard frame region. For example, the actual edges might occupy particular coordinates within the coordinate system of the video frames, and thus the computing system 100 could deem those particular coordinates to represent the scoreboard frame region. Alternatively, the computing system 100 could establish a minimum bounding rectangle that bounds the actual edges. This established minimum bounding rectangle may occupy particular coordinates within the coordinate system of the video frames, and the computing system 100 could deem those particular coordinates to represent the scoreboard frame region. Other examples are also possible.

In yet another implementation, the computing system 100 could detect the scoreboard frame region after engaging in a morphological-dilatation process. The computing system 100 could engage in the morphological-dilatation process after the filtering process and could detect the scoreboard frame region following completion of both processes. Alternatively, the computing system 100 could engage in the morphological-dilatation process without also engaging in the filtering process, and the computing system 100 could detect the scoreboard frame region following completion of the morphological-dilatation process.

In practice, a binary representation may include a region of foreground pixels that has "holes" (e.g., sub-regions of background pixels within the region), and engaging in a morphological-dilatation process could involve applying an operator that enlarges boundaries of the region. This could effectively reduce the size of holes within that region and could create a substantially uniform region of foreground pixels.

Accordingly, the computing system 100 could apply the morphological-dilatation process with respect to the binary representation of the actual edges (i.e., determined as a result of the filtering process) or could apply the morphological-dilatation process with respect to the binary representation of the edges of the above-mentioned identified subset (i.e., the subset including edges that are unchanging across the video frames of the sequence).

In one case, the binary representation of the actual edges may include a region of foreground pixels (e.g., foreground pixels that represent the actual edges) that has holes, and the computing system 100 could engage in the morphological-dilatation process to enlarge boundaries of that region and thus effectively reduce the size of holes within that region. To do so, the computing system 100 could apply the morphological-dilation process on the binary representation of the actual edges, so as to generate a binary representation of a substantially uniform region of foreground pixels.

In another case, the binary representation of the edges of the subset may include a region of foreground pixels (e.g., foreground pixels that represent the edges of the subset) that has holes, and the computing system 100 could engage in the morphological-dilatation process to enlarge boundaries of that region and thus effectively reduce the size of holes within that region. To do so, the computing system 100 could apply the morphological-dilation process on the binary representation of the edges of the subset, so as to generate a binary representation of a substantially uniform region of foreground pixels.

Advantageously, foreground pixels of the substantially uniform region might occupy a greater extent of the coordinate system of the video frames compared to the extent occupied by the actual edges or by the edges of the subset, and thus the computing system 100 might be more likely to successfully determine the scoreboard frame region based on the substantially uniform region than to determine the scoreboard frame region based on the actual edges or based on the edges of the subset.

Once the computing system 100 identifies the substantially uniform region, the computing system 100 could then use the substantially uniform region as basis to detect the scoreboard frame region. For example, the substantially uniform region might occupy particular coordinates within the coordinate system of the video frames, and thus the computing system 100 could deem those particular coordinates to represent the scoreboard frame region. Alternatively, the computing system 100 could establish a minimum bounding rectangle that bounds the substantially uniform region. This established minimum bounding rectangle might occupy particular coordinates within the coordinate system of the video frames, and thus the computing system 100 could deem those particular coordinates to represent the scoreboard frame region. Other examples and implementations are also possible.

Once the computing system 100 detects the video frame region that depicts the scoreboard, the computing system 100 could carry out an action based this detecting.

By way of example, the computing system 100 could establish a record of the detected video frame region. For instance, if the computing system 100 deems particular coordinates to represent the scoreboard frame region, then the computing system 100 could record an indication that these particular coordinates represent the scoreboard frame region.

In another example, the computing system 100 could output a report related to the detected scoreboard frame region. For instance, the computing system 100 could present such a report on a display screen and/or could cause a printer device to print the report, among other options. The report could indicate the particular coordinates representing the detected scoreboard frame region, among numerous other options.

Further, the computing system 100 could determine whether the detection of the scoreboard frame region was accurate and could take one action or another based on the determination.

In an example implementation, for instance, the computing system 100 could repeat the scoreboard-frame-region detecting process some number of times and could determine whether the computing system 100 detects the same scoreboard frame region each time, as a basis to determine accuracy of the detection.

For example, the computing system 100 could engage in two or more executions of the disclosed technique for detecting the scoreboard frame region, and could determine whether the computing system 100 detected the same scoreboard frame region at least a predetermined number of times. If the computing system 100 determines that it detected the same scoreboard frame region at least a predetermined number of times, then the computing system 100 could consider the detection of the scoreboard frame region to be accurate, and the computing system 100 could take a first action based on the detection being accurate. For instance, the first action could involve establishing a record of the detected scoreboard frame region and/or engaging in a further procedure to detect in the scoreboard frame region one or more sub-region(s) that depict text of the scoreboard. Whereas, if the computing system 100 does not detect the same scoreboard frame region at least the predetermined number of times, then the computing system 100 could take a second action based on the detection being inaccurate. For instance, the second action could involve again attempting to detect the scoreboard frame region in accordance with the disclosed technique, or outputting an error result.

In another implementation, computing system 100 could attempt extraction of a sport score from the detected scoreboard frame region and could determine accuracy based on whether this extraction is successful. Namely, once computing system 100 detects the scoreboard frame region, computing system 100 could carry out the remaining steps of the above-described digital imaging process in an attempt to extract a sport score from the scoreboard frame region in a given video frame. If the computing system 100 successfully extracts the sport score, then computing system 100 could take the first action that corresponds to this detected scoreboard frame region being accurate. But if the computing system 100 does not successfully extract the sport score, then computing system 100 could take the second action that corresponds to this detected scoreboard frame region being inaccurate. The first and second actions could take various forms as described above. Other implementations are also possible.

Figure 3A:
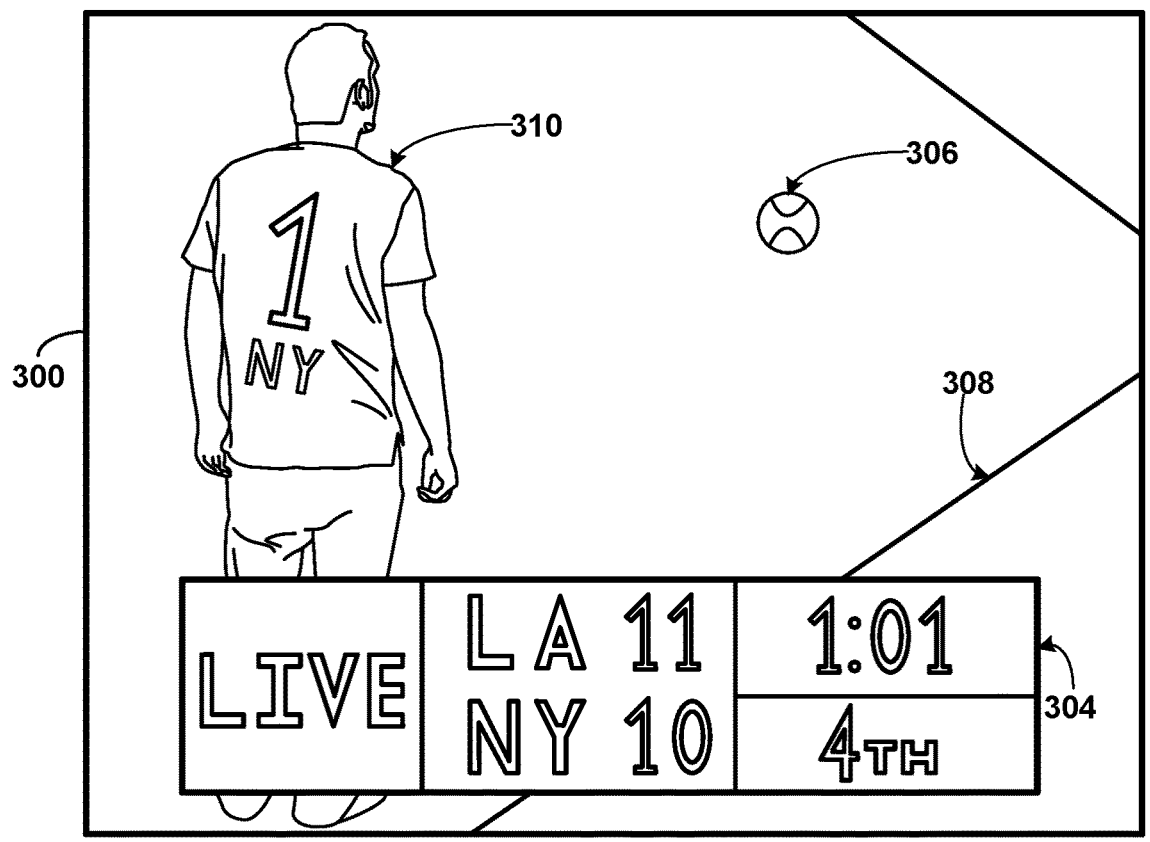
FIG. 3A illustrates an example set of edges detected in digital video frames that represent a sport event.
Figure 3A:
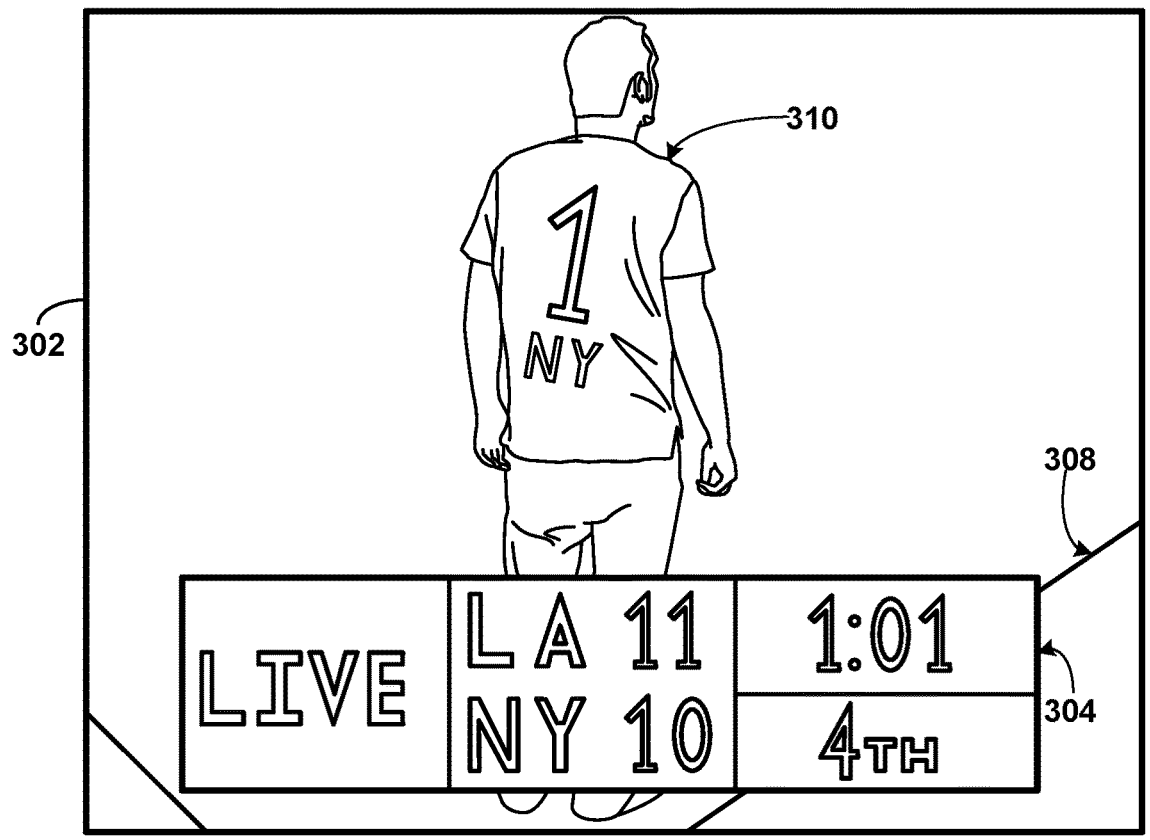
Figure 3B:
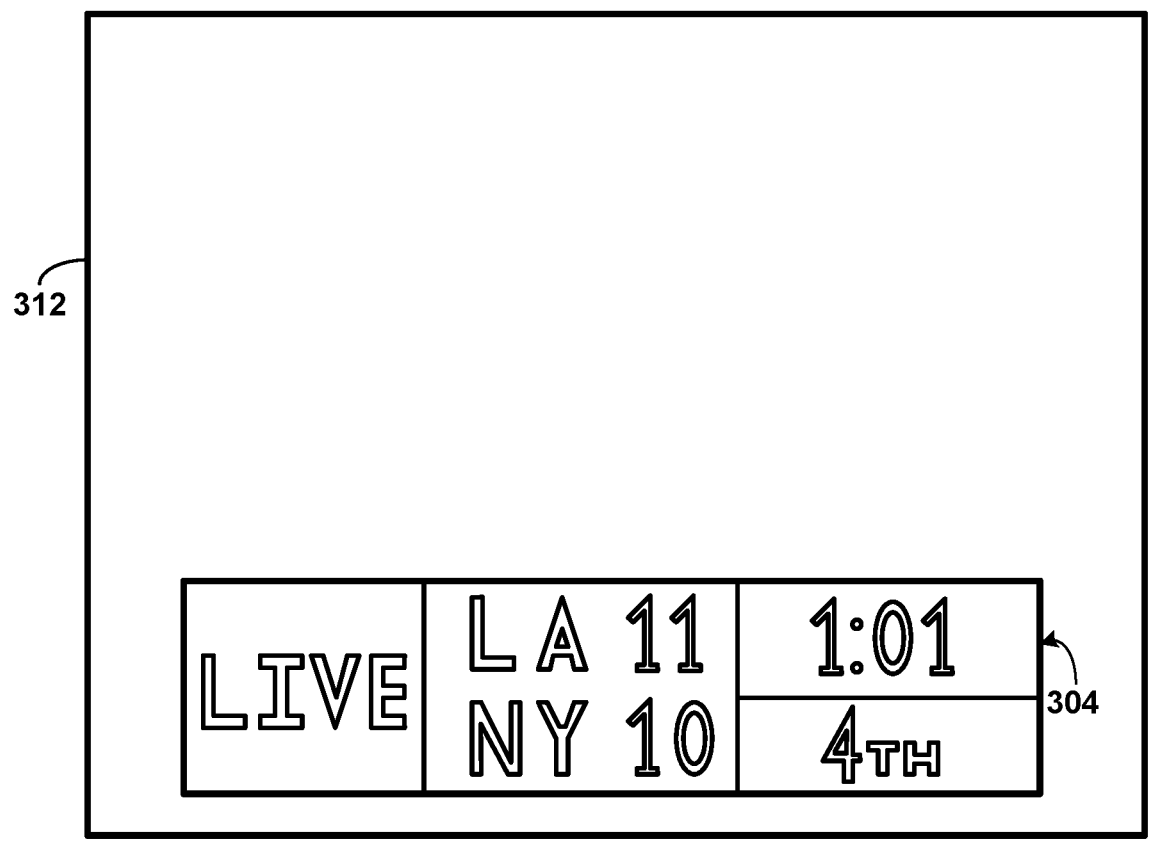
FIG. 3B illustrates an example subset of the detected set of edges.
Figure 3C:
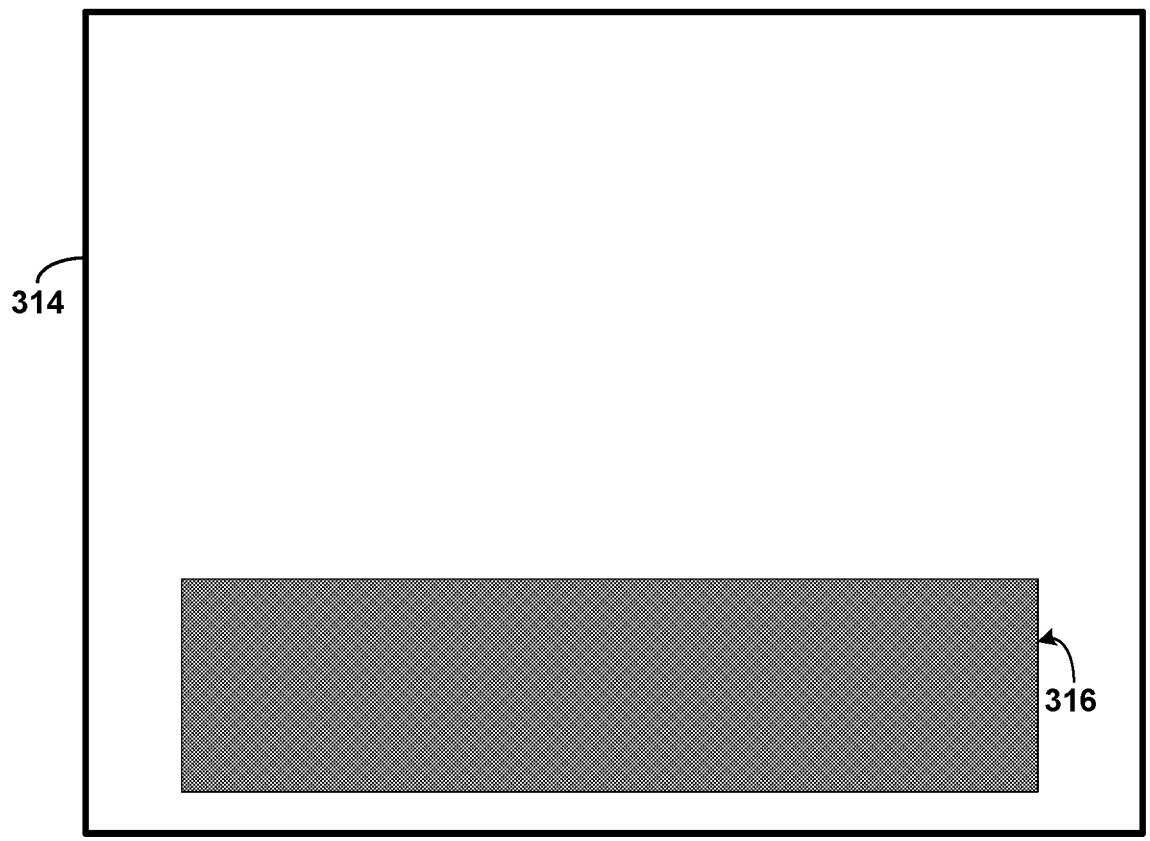
FIG. 3C illustrates an example substantially uniform region.

FIGS. 3A to 3C next depict binary images related to the disclosed technique for automatically detecting, in digital video frames, a video frame region that depicts a scoreboard.

FIG. 3A illustrates an example set of edges that the computing system 100 might detect in digital video frames that represent a sport event, in line with the discussion above. The set of edges includes (i) edges detected in a first video frame and represented by a first binary image 300 as well as (ii) edges detected in a second video frame and represented by a second binary image 302.

Some of these edges change across the binary images 300-302, and other edges do not change across the binary images 300-302. For example, edges of scoreboard 304 overlap in location across the binary images 300-302, which means that edges of the scoreboard 304 do not change across the binary images 300-302. However, binary image 300 represents edges of ball 306 and binary image 302 does not represent any edges of the ball 306, which amounts to edges of the ball 306 changing across the binary images 300-302. Also, binary images 300-302 represent edges of field 308 at different respective locations, which amounts to edges of the field 308 changing across the binary images 300-302. Similarly, binary images 300-302 represent edges of participant 310 at different respective locations, which amounts to edges of the participant 310 changing across the binary images 300-302.

FIG. 3B then illustrates an example binary image 312 representing a subset of the detected set of edges, the subset including edges that do not change across binary images 300-302. More specifically, the binary image 312 represents edges of the scoreboard 304 that do not change across the binary images 300-302. However, because edges of the ball 306, edges of the field 308, and edges of the participant 310 change respectively across the binary images 300-302 as described, the binary image 312 does not represent any edges of the ball 306, of the field 308, and of the participant 310.

FIG. 3C then illustrates an example binary image 314 representing just a substantially uniform region 316 following application of the morphological-dilation process to the binary image 312. As discussed above, the computing system 100 could use the substantially uniform region 318 as basis to detect the video frame region the video frame region that depicts the scoreboard 304. Other illustrations are also possible.

Figure 4:
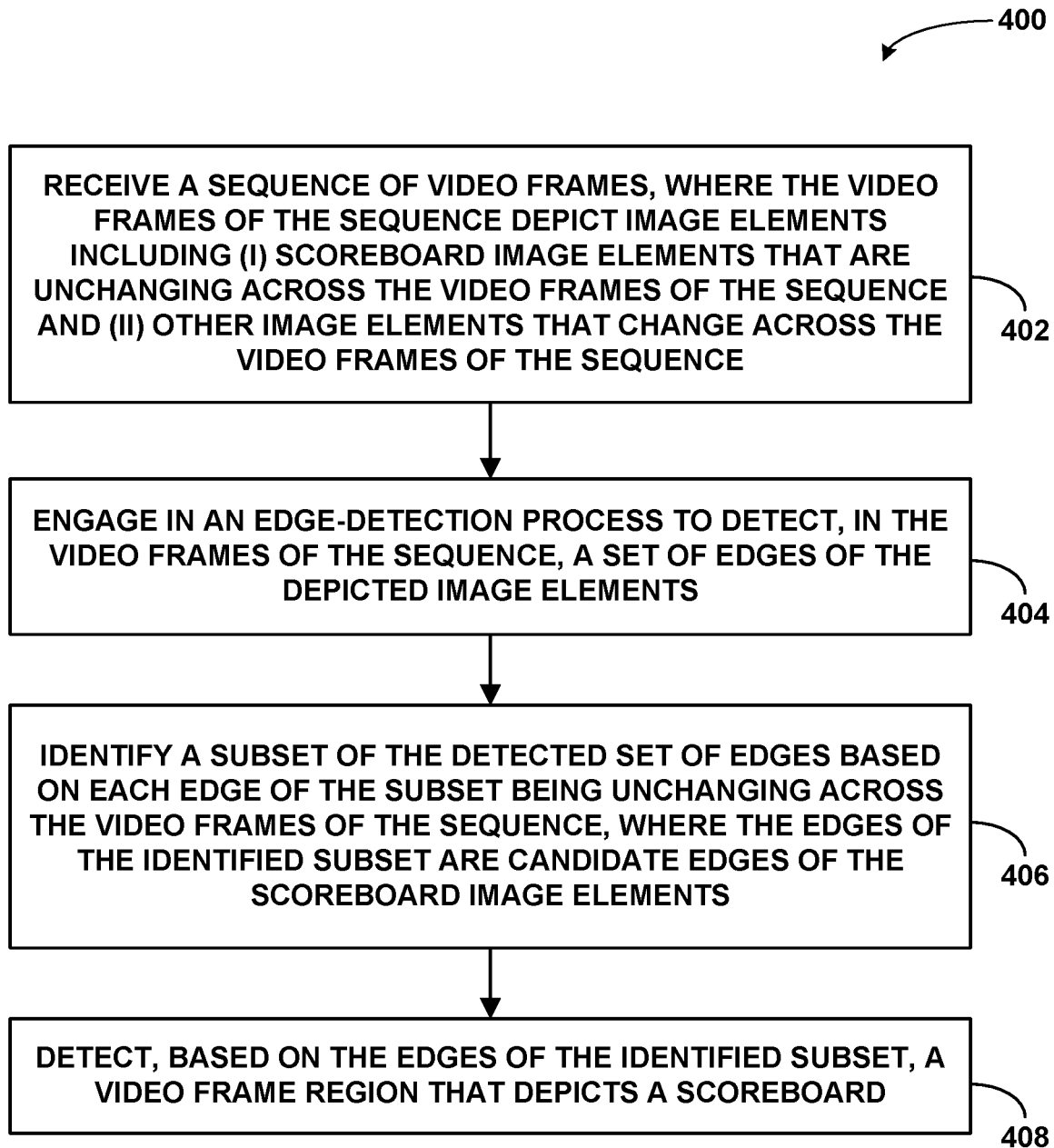
FIG. 4 is another flow chart depicting a method that could be carried out in accordance with the disclosure.

FIG. 4 is next another flowchart illustrating a method 400 that can be carried out in accordance with this disclosure. As shown by block 402 in FIG. 4, the method 400 involves receiving a sequence of video frames, where the video frames of the sequence depict image elements including (i) scoreboard image elements that are unchanging across the video frames of the sequence and (ii) other image elements that change across the video frames of the sequence. At block 404, method 400 then involves engaging in an edge-detection process to detect, in the video frames of the sequence, a set of edges of the depicted image elements. Further, at block 406, method 400 then involves identifying a subset of the detected set of edges based on each edge of the subset being unchanging across the video frames of the sequence, where the edges of the identified subset are candidate edges of the scoreboard image elements. And at block 408, method 400 then involves detecting, based on the edges of the identified subset, the video frame region that depicts the scoreboard.

II. Automatically Detecting a Video Frame Region that Depicts Scoreboard Text

As noted above, the present disclosure also provides a technique for automatically detecting, within a digital video frame, one or more video frame regions that each depict a textual expression of a scoreboard—such as a team name, a score, a game clock, or the like. The computing system 100 could carry out this technique as part of the above-described digital image processing. And once the computing system 100 carries out this technique, computing system 100 could have information about where text of a scoreboard might be depicted in any given one of the digital video frames included in the media stream.

In line with the discussion above, the technique could involve the computing system 100 (*i*) engaging in an edge-detection process to detect edges of scoreboard image elements within the scoreboard frame region of one of the digital video frames, (ii) applying pattern-recognition to determine which of the detected edges define alphanumeric shapes and are thus edges of alphanumeric characters, (iii) identifying a region that encompasses proximate alphanumeric shapes, and (iv) detecting one of the frame regions at issue based on the identified region that encompasses proximate alphanumeric shapes.

More specifically, a digital video frame might depict various image elements of a scoreboard. As discussed above, these scoreboard image elements could include a textual expression as well as other image elements. In practice, the textual expression might be a set of characters that are depicted substantially close to one another in the scoreboard and that could collectively form a word, phrase, number or the like associated with a sport event depicted by the digital video frame (e.g., a team name, a score, or a game clock). Given this, computing system 100 can leverage the closeness and other features of those characters to detect, within the digital video frame, a frame region that depicts the textual expression of the scoreboard.

To do so, as noted above, the computing system 100 can first engage in an edge-detection process to detect edges of the scoreboard image elements depicted in the digital video frame. The computing system 100 can engage in this edge-detection process to detect edges in a predefined frame region within the digital video frame. For instance, the predefined frame region could be a scoreboard frame region detected as described above, so that many or all of the detected edges are likely to be edges of scoreboard image elements. Moreover, in line with discussion above, an output of the edge-detection process could be a binary representation of the detected edges of the scoreboard image elements.

The detected edges of the scoreboard image elements could include detected edges of the textual expression and possibly detected edges of other image elements of the scoreboard. The detected edges of the textual expression may form or may otherwise define alphanumeric shapes, such as outlines of letters, numbers or other characters in the textual expression, and thus the detected edges of the textual expression might be distinguishable from detected edges of other image elements of the scoreboard.

Thus, the computing system 100 can make use of this distinction to recognize which edges are of the textual expression and to then identify a region that encompasses the textual expression. As noted above, this could involve computing system 100 (i) applying pattern-recognition one or more times to identify one or more alphanumeric shapes and (ii) identifying a region that encompasses proximate alphanumeric shapes.

During the pattern-recognition, the computing system 100 can identify edge(s) that enclose an area of the digital video frame, the computing system 100 can then determine whether the enclosed area has an alphanumeric characteristic, and, if the computing system 100 determines that the enclosed area has the alphanumeric characteristic, the computing system 100 can then deem the identified edge(s) (i.e., the edge(s) that enclose the area) as defining a given one of those alphanumeric shapes.

The computing system 100 could apply various processes to identify edge(s) that enclose an area of the digital video frame. For example, the computing system 100 could apply a contouring procedure to the binary representation of the detected edges of the scoreboard image elements, so as to identify edge(s) that enclose an area in the binary representation. The contouring procedure could involve identifying a sequence foreground pixels (i) that form or otherwise define a boundary of a shape represented by the binary representation and (ii) that enclose an area in the binary representation. In practice, such a contouring procedure could also be referred to as a contour tracing procedure, a border tracing procedure, and/or a boundary tracing procedure, among others. Examples of contouring procedures include Square Tracing, Moore-Neighbor Tracing, Radial Sweep, and Theo Pavlidis' algorithm, among others.

Once the computing system 100 identifies edge(s) that enclose an area in the binary representation, the computing system 100 can determine whether the enclosed area has an alphanumeric characteristic. As noted above, the computing system 100 could do so based on an aspect ratio of the enclosed area. In particular, the computing system 100 could determine the aspect ratio of the enclosed area, and could then determine whether the determined aspect ratio is indicative of the enclosed area having the alphanumeric characteristic.

For instance, alphanumeric characters are more likely to have particular aspect ratios and thus the computing system 100 could determine that an enclosed area has an alphanumeric characteristic if that enclosed area has one of those aspect ratios. For example, a letter, number, or other character is likely to have an aspect ratio that falls within a particular range (e.g., an aspect ratio between 0.1:1 and 1.5:1). And if the determined aspect ratio at issue is within the particular range, then the computing system 100 could determine that this aspect ratio is indicative of the enclosed area having the alphanumeric characteristic. Otherwise, the computing system 100 could determine that the determined aspect ratio is not indicative of the enclosed area having the alphanumeric characteristic.

The computing system 100 could determine the aspect ratio of the enclosed area in various ways. For example, the computing system 100 could determine a minimum bounding rectangle that bounds the enclosed area and could then determine an aspect ratio of that minimum bounding rectangle, as a ratio of the width and height of that rectangle. The computing system 100 could then deem the aspect ratio of that minimum bounding rectangle to be the aspect ratio of the enclosed area. Other examples are also possible.

If the computing system 100 determines that the enclosed area has the alphanumeric characteristic, then the computing system 100 can deem the identified edge(s) that enclose the area to define an alphanumeric shape. Otherwise, the computing system 100 might not deem those identified edge(s) to define an alphanumeric shape. In this way, the computing system 100 could apply the pattern-recognition to identify some or all of the alphanumeric shapes.

After applying the pattern-recognition, as noted above, the computing system 100 can then identify a region that encompasses proximate alphanumeric shapes. To do so, the computing system 100 can establish a plurality of minimum bounding rectangles each bounding a respective one of the identified alphanumeric shapes and can establish a composite shape based on at least some of those minimum bounding rectangles The computing system 100 can establish the plurality of minimum bounding rectangles in various ways. For example, the computing system 100 could update the binary representation of the detected edges of the scoreboard image elements, so that the updated binary representation represents each established minimum bounding rectangle as respectively encompassing the maximum extents of one of the identified alphanumeric shapes. For instance, one of the identified alphanumeric shapes could have minimum and maximum x-coordinates along an x-axis of the binary representation as well as minimum and maximum y-coordinates along a y-axis of the binary representation, and thus the updated binary representation may represent one of the established minimum bounding rectangles as spanning from the minimum x-coordinate to the maximum x-coordinate as well as from the minimum y-coordinate to the maximum y-coordinate. Thus, the established minimum bounding rectangles may effectively occupy regions each including one of the characters of the textual expression.

Once the computing system 100 establishes the plurality of minimum bounding rectangles, the computing system 100 can then establish the composite shape based on two or more of those minimum bounding rectangles. The computing system 100 could establish the composite shape in various ways.

In one implementation, establishing the composite shape could involve the computing system 100 respectively extending each minimum bounding rectangle. For example, assuming that the established minimum bounding rectangles are first and second minimum bounding rectangles, the computing system 100 could extend a first minimum bounding rectangle by a first extent and a second minimum bounding rectangle by a second extent. These first and second extents could be the same or different from one another. Additionally, given that the textual expression is likely depicted along a horizontal axis of the digital video frame, the computing system 100 could extend these minimum bounding rectangles respectively along the horizontal axis. In some cases, the computing system 100 could extend the first minimum bounding rectangle in one direction along the horizontal axis and the second minimum bounding rectangle in the opposite direction along the horizontal axis. In other cases, the computing system 100 could extend each such minimum bounding rectangle respectively in both directions along the horizontal axis. Other cases are also possible.

If the first and second minimum bounding rectangles are sufficiently close to one another, then the extending might merge together the extended first minimum bounding rectangle and the extended second minimum bounding rectangle into the composite shape. For instance, the computing system 100 might extend the first minimum bounding rectangle in one direction along the horizontal axis (e.g., towards the second minimum bounding rectangle) by a first extent and might extend the second minimum bounding rectangle the opposite direction along the horizontal axis (e.g., towards the first minimum bounding rectangle) by a second extent. And if the distance between these minimum bounding rectangles is at or less than a combination of the first and second extents, then the extending of these minimum bounding rectangles may result in the composite shape.

Further, the computing system 100 could carry out this extending in various ways. For example, the binary representation of the minimum bounding rectangles might represent the first minimum bounding rectangle as spanning a first set of foreground pixels and the second minimum bounding rectangle as spanning a second set of foreground pixels. The computing system 100 could update this binary representation to represent the extended first minimum bounding rectangle as spanning the pixels of the first set in combination with a first predetermined number of additional first foreground pixels, such that those additional foreground pixels are substantially alongside pixels of the first set. Also, computing system 100 could update this binary representation to represent the extended second minimum bounding rectangle as spanning the pixels of the second set in combination with a second predetermined number of additional second foreground pixels, such that those additional foreground pixels are substantially alongside pixels of the second set. These first and second predetermined numbers of pixels could be the same or different from one another. Other examples are also possible.

In another implementation, the operations for establishing this composite shape could involve the computing system 100 respectively extending just certain minimum bounding rectangles rather than extending each minimum bounding rectangle. For example, assuming again that the established minimum bounding rectangles are first and second minimum bounding rectangles, the computing system 100 could extend just the first minimum bounding rectangle by a particular extent. Here again, given that the textual expression is likely depicted along a horizontal axis of the digital video frame, the computing system 100 could extend the first minimum bounding rectangles respectively along the horizontal axis. Moreover, the computing system 100 could extend the first minimum bounding rectangle in one direction along the horizontal axis or in both directions along the horizontal axis.

Here again, if the first and second minimum bounding rectangles are sufficiently close to one another, then the extending in this implementation could also merge together the extended first minimum bounding rectangle and the extended second minimum bounding rectangle into the composite shape. For instance, the first minimum bounding rectangle may be at a particular distance away from the second minimum bounding rectangle along the horizontal axis. And the computing system 100 might extend the first minimum bounding rectangle in a particular direction along the horizontal axis (e.g., towards the second minimum bounding rectangle) by a particular extent. This particular extent may be at or greater than the particular distance, and thus the extending of the first minimum bounding rectangle may result in the composite shape.

In this implementation, the computing system 100 could carry out the extending in various ways. For instance, assuming again that the binary representation of the minimum bounding rectangles represents the first minimum bounding rectangle as spanning a first set of foreground pixels and the second minimum bounding rectangle as spanning a second set of foreground pixels, the computing system 100 could update this binary representation to represent the extended first minimum bounding rectangle as spanning the pixels of the first set in combination with a predetermined number of additional foreground pixels. These additional foreground pixels may be substantially alongside pixels of the first set. And this updated binary representation could still represent the second minimum bounding rectangle as spanning the pixels of the second set. Other implementations are also possible.

Once computing system 100 establishes the composite shape, the computing system 100 could then determine a particular region occupied by composite shape. To do so, the computing system 100 could apply a connected-component-labeling (CCL) procedure and could use results of the CCL procedure to determine the particular region occupied by composite shape. The CCL procedure could identify, in a binary representation, a set of foreground pixels that are connected with each other (e.g., located at neighboring coordinates) and could label each pixel of this set as being part of the same image component. Such labeling effectively amounts to detecting pixels that makes up this image component.

Given that the above-described updated binary representation might represent the composite shape as spanning a set of connected foreground pixels, the computing system 100 could apply the CCL procedure on the updated binary representation, so as to detect those pixels. For example, the updated binary representation might represent the composite shape as spanning a combined set of pixels that includes the pixels of the first set, the pixels of the second set, and the added pixels, and the computing system 100 could apply the CCL procedure on the updated binary representation so as to detect the pixels of the combined set that correspond to the composite shape. Other examples are also possible.

As noted above, after applying the CCL procedure, the computing system 100 could use results of the CCL procedure to determine the particular region occupied by composite shape. For example, after the computing system 100 applies the CCL procedure to detect the pixels of the combined set that correspond to the composite shape, the computing system 100 could deem those detected pixels to represent the particular region. This could involve the computing system 100 deeming coordinates of the detected pixels as coordinates of the particular region, among other options. Other examples are also possible.

Once the computing system 100 determines the particular region occupied by composite shape, the computing system 100 could use that particular region as basis to determine the video frame region that depicts the textual expression. For example, the computing system 100 could deem coordinates of the particular region to represent the video frame region that depicts the textual expression. In another example, the computing system 100 could establish a minimum bounding rectangle that bounds the particular region. This established minimum bounding rectangle might occupy particular coordinates within the coordinate system of the digital video frame, and the computing system 100 could deem those particular coordinates to represent the video frame region that depicts the textual expression. Other examples are also possible.

In a further aspect, the computing system 100 could carry out an action based on this detecting of the video frame region that depicts the textual expression.

In one example, the computing system 100 could establish a record of the detected video frame region. For instance, if the computing system 100 deems particular coordinates to represent the video frame region that depicts the textual expression, then the computing system 100 could record an indication that these particular coordinates represent the detected video frame region that depicts the textual expression.

In another example, the computing system 100 could output a report related to the detected video frame region. For instance, the computing system 100 could present such a report on a display screen and/or could cause a printer device to print the report, among other options. The report could indicate the particular coordinates representing the detected video frame region, among numerous other options.

In yet another example, the computing system 100 could recognize the textual expression in the detected video frame region and could take further actions based on the recognized textual expression. For instance, the computing system 100 could apply OCR to this video frame region in one of the digital video frames, so as to recognize characters of the textual expression depicted by the digital video frame. Further, the computing system 100 could use the recognized characters to determine sport-related information, such as a score for example. And the computing system 100 could then take an action based on determination of the score, such as transmission to a computing device of a notification indicating the score, among other options. Other examples are also possible.

Figure 5A:
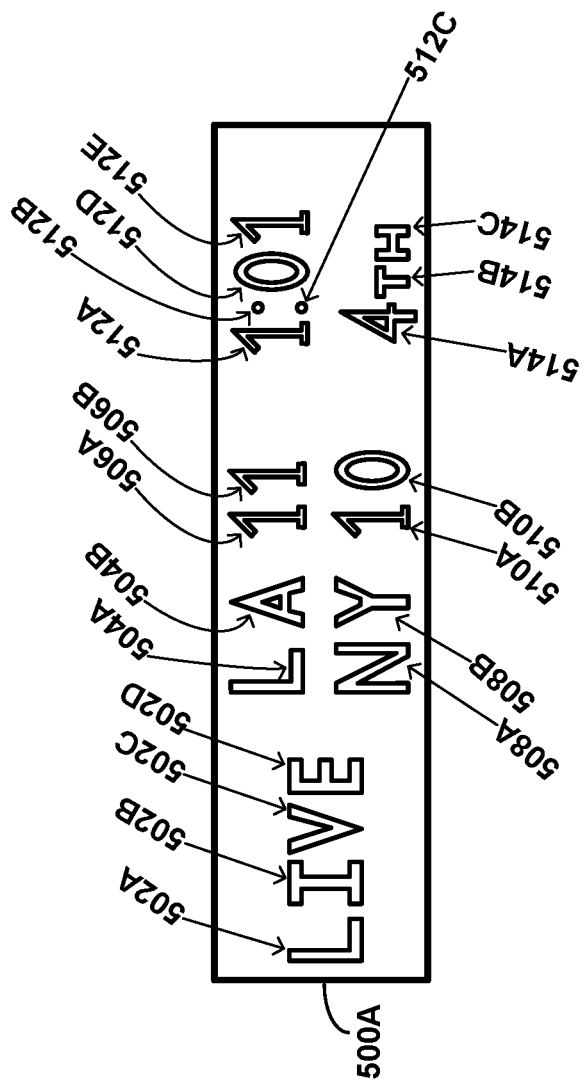
FIG. 5A illustrates example alphanumeric shapes in a scoreboard frame region.
Figure 5B:
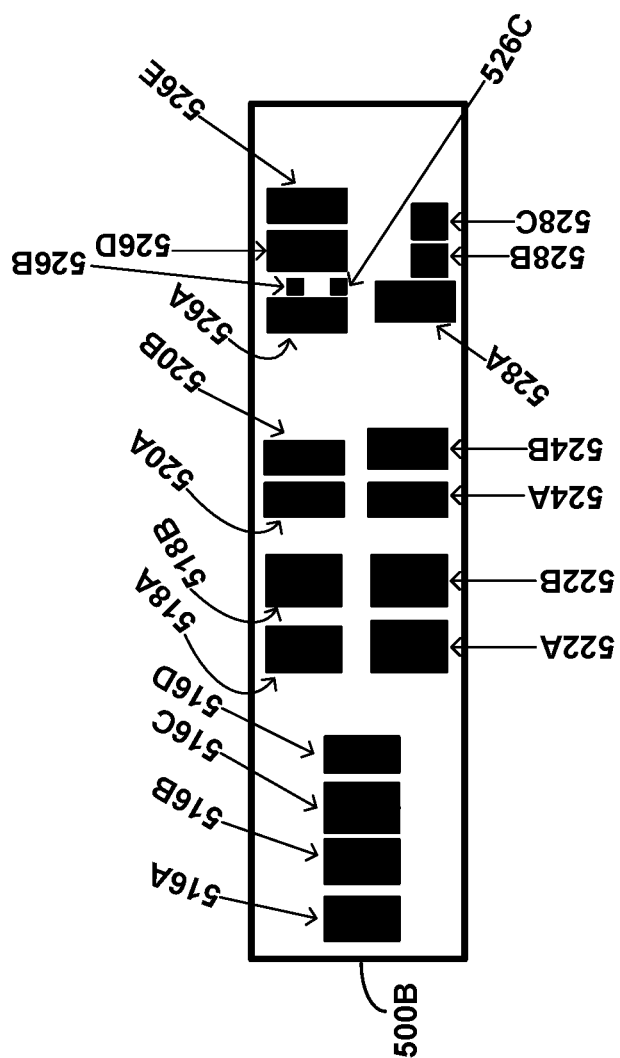
FIG. 5B illustrates example minimum bounding rectangles that bound the alphanumeric shapes.
Figure 5C:
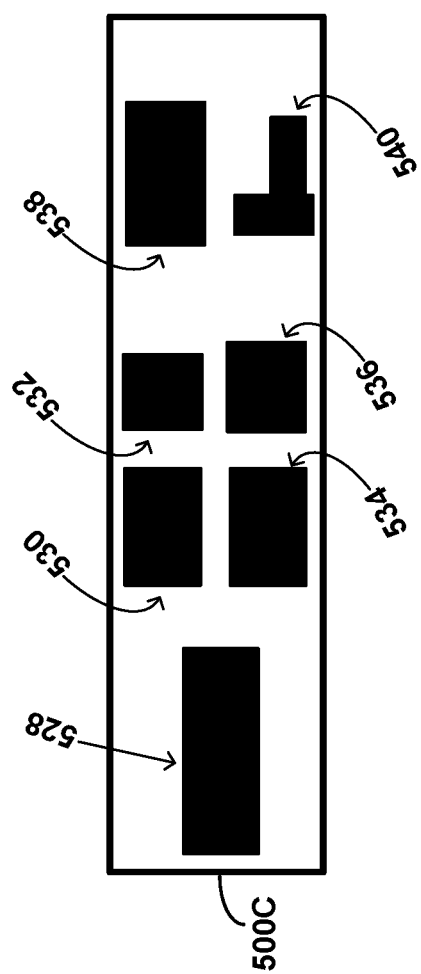
FIG. 5C illustrates example composites shapes established based on minimum bounding rectangles.

FIGS. 5A to 5C next depict binary images related to the disclosed technique for automatically detecting, within a digital video frame, a video frame region that depicts a textual expression of a scoreboard.

FIG. 5A illustrates example detected edges of scoreboard image elements depicted within a scoreboard frame region of a digital video frame. Specifically, binary image 500A represents: detected edges 502A-502D of the word "LIVE" depicted in the scoreboard, detected edges 504A-504B of the team name "LA" depicted in the scoreboard, detected edges 506A-506B of the score "11" depicted in the scoreboard, detected edges 508A-508B of the team name "NY" depicted in the scoreboard, detected edges 510A-510B of the score "10" depicted in the scoreboard, detected edges 512A-512E of the game clock "1:01" depicted in the scoreboard, and detected edges 514A-514C of the game period "4$^{th}$" depicted in the scoreboard. Each of these edges 502A to 514C respectively defines an alphanumeric shape.

FIG. 5B next illustrates example minimum bounding rectangles each covering one of the alphanumeric shapes shown in FIG. 5A. Specifically, binary image 500B represents: minimum bounding rectangles 516A-516D that respectively cover the detected edges 502A-502D of the word "LIVE", minimum bounding rectangles 518A-518B that respectively cover the detected edges 504A-504B of the team name "LA", minimum bounding rectangles 520A-520B that respectively cover the detected edges 506A-506B of the score "11", minimum bounding rectangles 522A-522B that respectively cover the detected edges 508A-508B of the team name "NY", minimum bounding rectangles 524A-524B that respectively cover the detected edges 510A-510B of the score "10", minimum bounding rectangles 526A-526E that respectively cover the detected edges 512A-512E of the game clock "1:01", and minimum bounding rectangles 528A-528C that respectively cover the detected edges 514A-514C of the period "4$^{th}$".

FIG. 5C next illustrates example composite shapes established based on the minimum bounding rectangles shown in FIG. 5B. Specifically, binary image 500C represents: a composite shape 528 established based on the merging of minimum bounding rectangles 516A-516D, a composite shape 530 established based on the merging of minimum bounding rectangles 518A-518B, a composite shape 532 established based on the merging of minimum bounding rectangles 520A-520B, a composite shape 534 established based on the merging of minimum bounding rectangles 522A-522B, a composite shape 536 established based on the merging of minimum bounding rectangles 524A-524B, a composite shape 538 established based on the merging of minimum bounding rectangles 526A-526E, and a composite shape 540 established based on the merging of minimum bounding rectangles 528A-528C.

Given these composite shapes 528-540, the computing system 100 could then detect video frame regions that depict text of scoreboard. For example, the computing system 100 could use composite shape 528 as basis to detect a video frame region that depicts the word "LIVE", could use composite shape 530 as basis to detect a video frame region that depicts the team name "LA", could use composite shape 532 as basis to detect a video frame region that depicts the score "11", could use composite shape 534 as basis to detect a video frame region that depicts the team name "NY", could use composite shape 536 as basis to detect video frame region that depicts the score "10", could use composite shape 538 as basis to detect a video frame region that depicts the game clock "1:01", and/or could use composite shape 540 as basis to detect a video frame region that depicts the game period "4$^{th}$".

Figure 6:
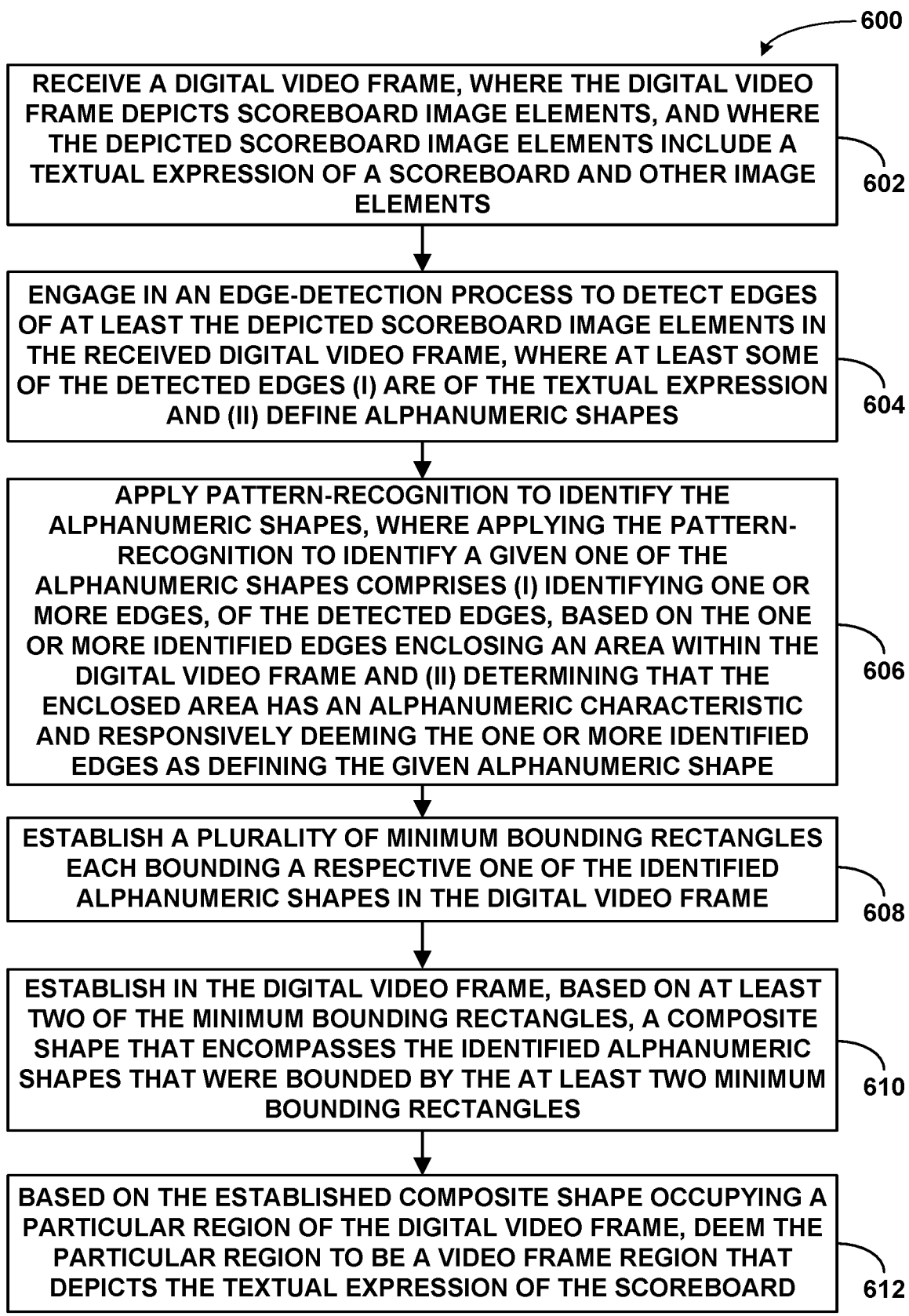
FIG. 6 is yet another flow chart depicting a method that could be carried out in accordance with the disclosure.

FIG. 6 is next another flowchart illustrating a method 600 that can be carried out in accordance with this disclosure. As shown by block 602 in FIG. 6, the method 600 involves receiving a digital video frame, where the digital video frame depicts scoreboard image elements, and where the depicted scoreboard image elements include a textual expression of a scoreboard and other image elements. At block 604, method 600 then involves engaging in an edge-detection process to detect edges of at least the depicted scoreboard image elements in the received digital video frame, where at least some of the detected edges (i) are of the textual expression and (ii) define alphanumeric shapes.

Additionally, at block 606, method 600 then involves applying pattern-recognition to identify the alphanumeric shapes, where applying the pattern-recognition to identify a given one of the alphanumeric shapes comprises (i) identifying one or more edges, of the detected edges, based on the one or more identified edges enclosing an area within the digital video frame and (ii) determining that the enclosed area has an alphanumeric characteristic and responsively deeming the one or more identified edges as defining the given alphanumeric shape. Further, at block 608, method 600 then involves establishing a plurality of minimum bounding rectangles each bounding a respective one of the identified alphanumeric shapes in the digital video frame. Yet further, at block 610, method 600 then involves establishing in the digital video frame, based on at least two of the minimum bounding rectangles, a composite shape that encompasses the identified alphanumeric shapes that were bounded by the at least two minimum bounding rectangles. And at block 612, method 600 then involves, based on the established composite shape occupying a particular region of the digital video frame, deeming the particular region to be the video frame region that depicts the textual expression of the scoreboard.

III. Automatically Extracting Sport-Related Information from Digital Video Frames As noted above, the present disclosure also provides a technique for automatically extracting, from a digital video frame, sport-related information. The computing system 100 could carry out this technique as part of the above-described digital image processing, in order to obtain sport-related information, such as information that is depicted in a scoreboard. This sport-related information could include a first team name, a second team name, a first score, a second score, and/or a game time associated with a sport event depicted by the digital video frame, among other possibilities.

In line with the discussion above, the computing system 100 could determine team names and their corresponding scores by (i) identifying sub-regions that are arranged according to how those team names and scores might be arranged on a scoreboard, and (ii) then analyzing text in those identified sub-regions. Each such sub-region may be one of the above-mentioned frame regions detected as depicting a textual expression of the scoreboard.

To facilitate this, the computing system 100 could include or have access to data indicating candidate geometric arrangements of frame regions, each candidate geometric arrangement corresponding to one of several possible arrangements of team names and scores on a scoreboard. This data could be image data for template images that respectively depict the candidate geometric arrangements and/or could be metadata for such template images, among other options. Nonetheless, for a given one of these candidate geometric arrangements, this data could indicate how frame regions are arranged relative to one another, a number of frame regions associated with the candidate geometric arrangement, respective characteristics of the frame regions associated with the candidate geometric arrangement, and/or respective candidate locations of the team names and scores in the candidate geometric arrangement, among other possibilities.

Given this data, the computing system 100 could evaluate frame regions that were detected as depicting text of the scoreboard, to determine which of those frame regions are arranged substantially in accordance with one of the candidate geometric arrangements.

More specifically, the computing system 100 could select a set of frame regions from among the frame regions that were detected as depicting text of the scoreboard, and the computing system 100 could base this selection on the frame regions of the selected set cooperatively having a geometric arrangement that corresponds with one of the candidate geometric arrangements.

The computing system 100 could use various techniques to facilitate selection of the set. For example, the computing system 100 could carry out a template matching process to analyze an image and to thereby determine whether a part of the image matches a template image. Thus, the computing system 100 could execute such a template matching process to determine that a set of frame regions in the digital video frame matches one of the above-mentioned template images, and could responsively deem that set to be the selected set. Other techniques are also possible.

In some implementations, the computing system 100 could also use one or more additional factors as basis for selecting the set of frame regions.

For example, the computing system 100 could select the set further based on the selected set including a particular number of frame regions. This particular number could be predetermined or could be based on the sport event being depicted by the digital video frame.

Specifically, the computing system 100 could select the set further based on the selected set including a predetermined number of frame regions that cooperatively have a geometric arrangement that corresponds with one of the candidate geometric arrangements. Generally, numerous sport events are likely associated with scoreboards that each respectively depict information according to a rectangular arrangement as discussed above, and thus such scoreboard information is often depicted within four frame regions. Given this, the predetermined number of frame regions could be four frame regions. However, the predetermined number of frame regions could be another number of frame regions.

Alternatively, the computing system 100 could select the set further based on the selected set including a particular number of frame regions expected for the sport event being depicted by the digital video frame. More specifically, although scoreboard information is often depicted within four frame regions, sometimes scoreboard information could be depicted within more than four frame regions. For instance, a score for each team in a soccer game might include the number of goals scored respectively by each team, and thus the scores and team names might be depicted within four frame regions. In contrast, a score for each team in a baseball game might include at least (i) a number of runs scored by a given team respectively in each of nine innings and (ii) a total number of runs scored by the given team, and thus the scores and team names might be depicted within at least twenty two frame regions. Given this, computing system 100 could determine the sport event depicted by the video frame (e.g., based on EPG data as described above), and could use this determined sport event as basis to determine a number of frame regions to be included in the set. As such, computing system 100 could select the set further based on the selected set including this determined number of frame regions.

To facilitate this, computing system 100 may include or have access to mapping data that maps various sport events to a respective numbers of frames regions, and the computing system could use this mapping data as a basis to determine the number of frame regions to be included in the set. For instance, the mapping data might map a basketball game to four frame regions and a baseball game to twenty-two frame regions. Thus, if computing system 100 determines that a baseball game is depicted by the digital video frame, then computing system 100 could determine according to the mapping data that the computing system should include twenty-two frame regions in the set.

In another example, computing system 100 could select the set based on the frame regions of the selected set having particular geometric characteristics.

In particular, certain frame regions might depict the scoreboard information, and some or all of these frame regions could have substantially matching geometric characteristics. For example, a scoreboard might depict both team names and scores using the same font and font size, might depict each team name respectively using a particular number of characters (e.g., 3 characters), and might depict each score respectively using another number of characters (e.g., 2 characters). In this situation, due to the difference in the number of characters used, a frame region that depicts a team name is likely to have a width that is substantially different from a width of frame regions that depicts a score. However, because the same number of characters is used to respectively depict each team name, the frame regions that depict the team names might have the same or similar respective widths as one another. Also, because the same number of characters is used to respectively depict each score, the frame regions that depict the scores might have the same or similar respective width as one another. Moreover, due to use of the same font and font size, all of the frame regions at issue could have the same height.

Given this, the computing system 100 could select frame regions of the set based on (i) geometric characteristics of one of the selected frame regions substantially matching (ii) geometric characteristics of another one of the selected frame regions. For instance, the computing system 100 could select frame regions of the set based on two of the selected frame regions having substantially the same height, width, size, and/or shape. In another instance, the computing system 100 could select frame regions of the set based on all of the selected frame regions having substantially the same height, width, size, and/or shape.

When the computing system is working to determine whether frame regions have substantially matching geometric characteristics (such as dimensions), the system could consider whether the geometric characteristics of the frame regions match each other to a defined threshold degree. For instance, the computing system 100 could determine a difference between (i) a first height of a first frame region and (ii) a second height of a second frame region, could determine that the determined difference is less than a predefined threshold difference, and could responsively deem the first and second heights as substantially matching one another. Other instances and examples are also possible.

Once the computing system 100 selects the set of frame regions, the computing system 100 could then recognize characters respectively within each of the frame regions of the selected set. As discussed above, the computing system 100 could do so by applying OCR to the frame regions of the selected set.

After the computing system 100 recognizes the characters, the computing system 100 could optionally evaluate the recognized characters, so as to determine whether certain criteria is met before proceeding with detection of scoreboard information based on the recognized characters. In many situations, team names likely consist of just letters and teams' scores likely consist of just digit(s). Also, the team names are likely to be depicted within two frame regions and the scores are likely to be depicted within two or more frame regions. Given this, the computing system 100 could determine whether (i) two frame regions of the set each respectively include just letters as the recognized characters and (ii) at least two other frame regions of the set each respectively include just one or more digits as the recognized characters. If the computing system 100 determines that this is the case, then the computing system 100 could responsively proceed to detect the scoreboard information based the recognized characters. Otherwise, the computing system 100 could responsively select another set of frame regions, recognize characters in frame regions of that set, and so on.

Accordingly, the computing system 100 could use the recognized characters as basis to detect the scoreboard information. In practice, this might include detecting the first team name based on the recognized characters in a first frame region of the selected set, detecting the second team name based on the recognized characters in a second frame region of the selected set, detecting the first score based on the recognized characters in a third frame region of the selected set, and detecting the second score based on the recognized characters in a fourth frame region of the selected set etc. Further, the computing system 100 could detect scoreboard information based on the recognized characters in various ways.

In one case, the computing system 100 could determine that a particular frame region of the set includes just letters as the recognized characters, and could responsively detect one of the team names based on those recognized characters. For instance, the computing system 100 could record those letters to represent a first of the team names, among other possibilities. The computing system 100 could also apply a similar technique to detect the second of the team names.

In another case, the computing system 100 could determine that a particular frame region of the set includes just one or more digits as the recognized characters, and could responsively detect one of the scores based on those recognized characters. For instance, the computing system 100 could record those digit(s) to represent a first of the scores, among other possibilities. The computing system 100 could also apply a similar technique to detect the second of the scores.

In yet another case, given that each frame region of the set has a respective location relative to other frame regions of the set, the computing system 100 could detect the scoreboard information based on the above-mentioned data indicating respective candidate locations of team names and scores.

For example, the computing system 100 could determine that (i) a respective location of a particular frame region in the set corresponds to (ii) the candidate location of a team name in the candidate geometric arrangement, and the computing system 100 could responsively detect one of the team names based on the recognized characters in the particular frame region. For instance, the computing system 100 could record these recognized characters to represent a first of the team names, among other possibilities. The computing system 100 could also apply a similar technique to detect the second of the team names.

In another example, the computing system 100 could determine that (i) a respective location of a particular frame region in the set corresponds to (ii) the candidate location of a score in the candidate geometric arrangement, and the computing system 100 could responsively detect one of the scores based on the recognized characters in the particular frame region. For instance, the computing system 100 could record these recognized characters to represent a first of the scores, among other possibilities. The computing system 100 could also apply a similar technique to detect the second of the score. Other cases and examples are also possible.

In a further aspect, as discussed above, the computing system 100 could additionally or alternatively extract, from the digital video frame, a game time associated with the sport event depicted by the digital video frame. To do so, the computing system 100 could recognize characters within one of the frame regions that have been detected as depicting text of the scoreboard, could make a determination that these recognized characters are arranged according to a predetermined pattern, and could respond to that determination by detecting the time based on these recognized characters and the predetermined pattern.

In practice, the predetermined pattern might be a regular expression predefining a sequence of candidate characters for representing the game time. For example, a regular expression associated with a game clock may predefine a sequence including: a first digit in the range of one to nine, followed by a colon, followed by a second digit in the range of one to nine, followed by a third digit in the range of one to nine. So if the computing system 100 recognizes, for example, the digit "1", followed by a colon, followed by the digit "2", and then followed by the digit "3", then the computing system 100 could record a time of "1:23" as the game clock. Other examples are also possible.

Figure 7A:
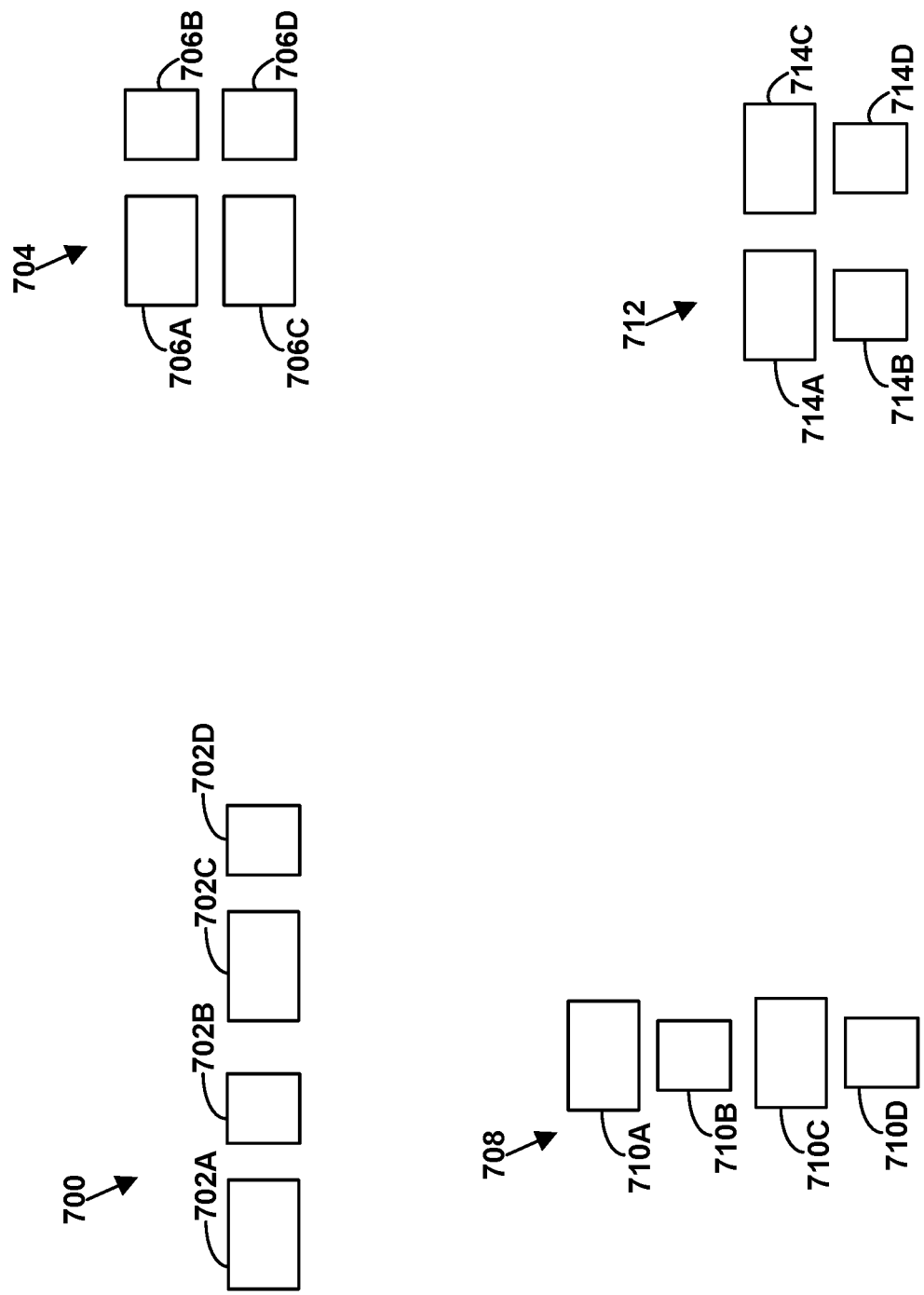
FIG. 7A illustrates example candidate geometric arrangements of scoreboard information.
Figure 7B:
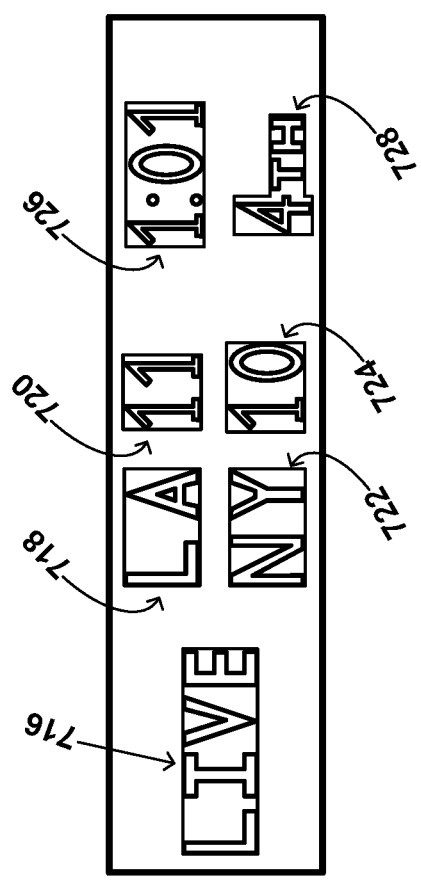
FIG. 7B illustrates example frame regions that depict text of a scoreboard.

FIGS. 7A to 7B next include depictions related to the disclosed technique for automatically extracting sport-related information from a digital video frame.

FIG. 7A illustrates example candidate geometric arrangements of frame regions. Specifically, FIG. 7A illustrates a candidate geometric arrangement 700 of regions 702A-702D, a candidate geometric arrangement 704 of regions 706A-706D, a candidate geometric arrangement 708 of regions 710A-710D, and a candidate geometric arrangement 712 of regions 714A-714D.

FIG. 7B next illustrates example frame regions that have been detected as depicting text of a scoreboard. Specifically, frame region 716 depicts the word "LIVE", frame region 718 depicts the team name "LA", frame region 720 depicts the score "11", frame region 722 depicts the team name "NY", frame region 724 depicts the score "10", frame region 726 depicts the game clock "1:01", and frame region 728 depicts the game period "4$^{th}$".

Given this, the computing system 100 could extract sport-related information. For example, the computing system 100 could select a set of frame regions including frame regions 718, 720, 722, and 724 and do so based on frame regions 718, 720, 722, and 724 cooperatively having a geometric arrangement that corresponds with candidate geometric arrangement 704. Then, the computing system 100 could recognize characters within each of the frame regions of the selected set, and could detect (i) the team name "LA" based on the recognized characters in frame region 718, (ii) the score "11" based on the recognized characters in frame region 720, (iii) the team name "NY" based on the recognized characters in frame region 722, and (iv) the score "10" based on the recognized characters in frame region 742. In another example, the computing system 100 could recognize characters in frame region 726, and could detect the game clock "1:01" based on those recognized characters and the regular expression of the game clock. Other examples are also possible.

Figure 8:
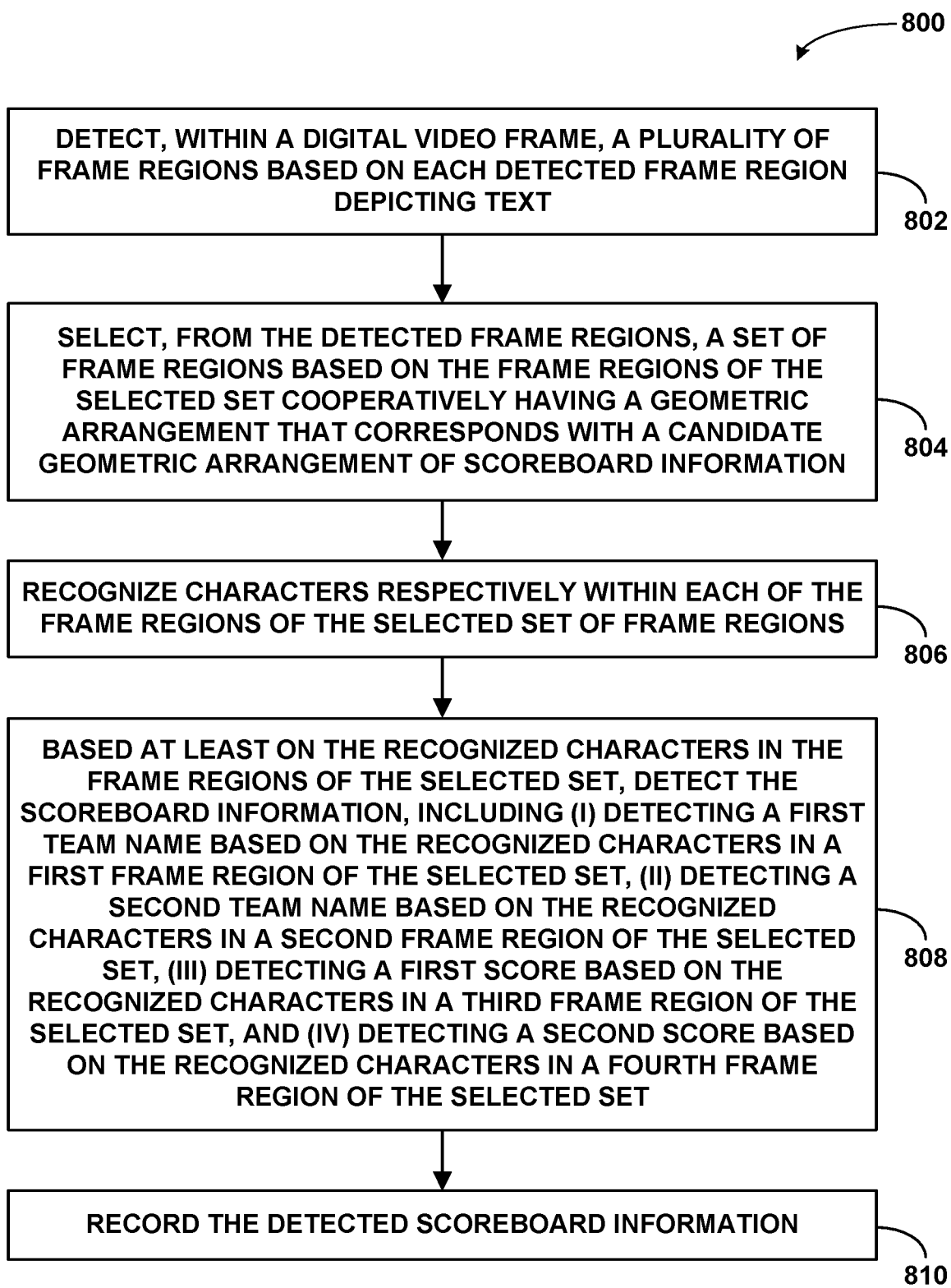
FIG. 8 is yet another flow chart depicting a method that could be carried out in accordance with the disclosure.

FIG. 8 is next another flowchart illustrating a method 800 that can be carried out in accordance with this disclosure. As shown by block 802 in FIG. 8, the method 800 involves detecting, within a digital video frame, a plurality of frame regions based on each detected frame region depicting text. At block 804, method 800 then involves selecting, from the detected frame regions, a set of frame regions based on the frame regions of the selected set cooperatively having a geometric arrangement that corresponds with a candidate geometric arrangement of scoreboard information.

Additionally, at block 806, method 800 then involves recognizing characters respectively within each of the frame regions of the selected set of frame regions. Further, at block 808, method 800 then involves, based at least on the recognized characters in the frame regions of the selected set, detecting the scoreboard information, including (i) detecting a first team name based on the recognized characters in a first frame region of the selected set, (ii) detecting a second team name based on the recognized characters in a second frame region of the selected set, (iii) detecting a first score based on the recognized characters in a third frame region of the selected set, and (iv) detecting a second score based on the recognized characters in a fourth frame region of the selected set. And at block 810, method 800 then involves recording the detected scoreboard information.

IV. Automatically Determining Accuracy of Sport-Related Information Extracted from Digital Video Frames As noted above, the present disclosure also provides a technique for automatically determining accuracy of sport-related information extracted from a time sequence of digital video frames that represent a sport event. The computing system 100 could carry out this technique after the computing system 100 completes the above-described digital image processing. As such, this technique could advantageously enable the computing system 100 to verify that extracted sport-related information is accurate before taking certain action(s).

In line with the discussion above, the disclosed technique could involve automatically determining the accuracy based on whether an attribute changes over time as expected according to the sport event. The attribute could be a score or a time associated with the sport event, among other options.

Specifically, the computing system 100 could carry out the above-described processes multiple times over the course of the time sequence, so as to extract instances of an attribute respectively from two or more digital video frames of the time sequence. For example, computing system 100 could extract a first instance of the attribute from a first video frame and a second instance of the attribute from a second video frame. Such extracted instances could indicate how the attribute changes over the time sequence. For example, the attribute could change by a particular extent, change at a particular rate, and/or exceed certain limits, among other possibilities.

Various factors could impact how an attribute is expected to change. For instance, each sport event has a corresponding set of rules, and these rules might impact how an attribute is expected to change. For example, in a basketball game, a score can only increase by one, two, or three points at any given instance of change of the score. Further, certain changes of an attribute may be unlikely in most sport events. For example, a score is unlikely to decrease and is unlikely exceed a certain value (e.g., two hundred) in most sport events. In another example, a game clock cannot increase by one hour in a span of two minutes. Numerous other examples are also possible.

Leveraging these assumptions, the computing system 100 could determine a pattern of change of the attribute, could make a determination of whether the detected pattern is an expected pattern, and could determine accuracy based on this determination.

More specifically, the computing system 100 could use the extracted sport-related information as basis to detect a pattern of change of the attribute over the time sequence of digital video frames. In this process, the computing system 100 could detect a pattern among instances of the attribute respectively extracted from two or more digital video frames of the time sequence. In some cases, those digital video frames may be consecutive digital video frames that immediately follow one another in the time sequence. In other cases, those digital video frames may be any two or more digital video frames from the time sequence. In either case, the computing system 100 could facilitate detection of the pattern in various ways.

In one implementation, the computing system 100 detecting the pattern could involve the computing system 100 determining that the attribute increased or decreased and/or the computing system 100 determining an extent to which the attribute changed. For instance, as noted above, the sport-related information could include a first instance of the attribute as extracted from a first video frame and a second instance of the attribute as extracted from a second video frame. Given this, the computing system 100 could determine a difference between the first and second instances, and the computing system 100 could then determine whether the attribute increased or decreased based on the determined difference. Additionally or alternatively, computing system 100 could use this determined difference as basis to determine an extent to which the attribute changed, such as an increment of change of the attribute.

For example, a score of five may have been extracted from a first digital video frame and a score of six may have been extracted from a second digital video frame that immediately follows the first digital video frame in the time sequence. Given this, the computing system 100 could determine a difference between these two instances of the score, and could determine that the score increased by one based on that determined difference. Other examples are also possible.

On this point, the computing system 100 could evaluate extracted instances of the attribute until the computing system 100 detects an occurrence at which that the attribute changed. In particular, the computing system 100 may extract instances of the attribute respectively from digital video frames that are threshold close to one another in the time sequence (e.g., from consecutive video frame or from every N video frames, with N being a number that allows the frames to be threshold close). And the computing system 100 could then evaluate those extracted instances over time until the computing system 100 detects that the attributed changed (e.g., increased or decreased) as discussed. At that point, the computing system 100 could also determine an extent to which the attribute changed as discussed.

For example, a score of nine may have been extracted from a first digital video frame, a score of nine may have been extracted from a second digital video frame that immediately follows the first digital video frame in the time sequence, and score of ten may have been extracted from a third digital video frame that immediately follows the second digital video frame in the time sequence. Given this, the computing system 100 could determine a difference between the two instances of the score extracted from the first and second digital video frames, and could determine that the score did not change based on that determined difference. Then, the computing system 100 could determine a difference between the two instances of the score extracted from the second and third digital video frames, and could determine that the score changed based on that determined difference, and more specifically that the score increased by one, thereby indicating an instance of change of the score. Other examples are also possible.

In another implementation, the computing system 100 detecting the pattern could involve the computing system 100 determining a rate of change of the attribute, such as a rate of increase or decrease of the attribute. In particular, the computing system 100 could determine a difference between first and second instances of the attribute as described, and the computing system 100 could also determine a time period between first and second digital video frames in the time sequence (e.g., the first and second digital video frames from which the first and second instances were extracted). Given this, the computing system 100 could determine a rate of change of the attribute based on the determined difference relative to the determined time period. For example, the computing system 100 could make determination that the score increased by one and that the time period is one second, and could use thus determine that a rate corresponding to an increase of the score by a value of one over one second.

In this implementation, the computing system 100 could facilitate determination of the time period in various ways. For example, when the computing system 100 receives a media stream including digital video frames, the media stream could include a timestamp respectively per digital video frame. Given this, the computing system 100 could read the respective timestamps of the above-mentioned first and second digital video frames and could determine the time period at issue by computing a difference between those timestamps. Other examples and implementations are also possible.

Before, during, and/or after the computing system 100 detects the pattern of change of the attribute over the time sequence, the computing system 100 could determine an expected pattern of change of the attribute in accordance with the sport event.

To facilitate this, the computing system 100 could have access to mapping data indicating expected pattern(s) of change of attribute(s). For instance, the computing system 100 could have access to mapping data that indicates, for each of a plurality of sport events, a respective expected pattern of change of an attribute. By way of example, the mapping data might indicate how a score is expected to change during a soccer game as well as how a score is expected to change during a basketball game. Similarly, the mapping data might indicate how a game clock is expected to change during a soccer game as well as how a game clock is expected to change during a basketball game. Other examples are also possible.

Given this, the computing system 100 could determine the sport event depicted by the digital video frames, and the computing system 100 could use the mapping data as basis to determine the expected pattern of change of the attribute in accordance with the depicted sport event. Here again, the computing system 100 could determine the depicted sport event based on EPG data as described above, among other options.

Once the computing system 100 detects the pattern of change and determines the expected pattern, the computing system 100 could then make the determination of whether the detected pattern is the expected pattern and could determine accuracy based on this determination. The computing system 100 could do so in various ways.

In one case, the computing system 100 could make a determination of whether a particular change of the attribute corresponds to an increase of the attribute or rather to a decrease of the attribute, and the computing system 100 could determine accuracy based on this determination. For instance, the computing system 100 could (i) deem the sport-related information to be accurate if the determination is that the particular change corresponds to the increase and (ii) deem the sport-related information to be inaccurate if the determination is that the particular change corresponds to the decrease. Whereas, the computing system 100 could (i) deem the sport-related information to be accurate if the determination is that the particular change corresponds to the decrease and (ii) deem the sport-related information to be inaccurate if the determination is that the particular change corresponds to the increase.

By way of example, the sport event depicted by the digital video frame might be a basketball game, and a shot clock in a basketball game typically decreases and does not increase. Given this, the computing system 100 could detect that the shot clock decreased and could determine according to the mapping data that that shot clock can decrease during a basketball game. As a result, the computing system 100 could determine that decrease of the shot clock is as expected, and could responsively deem the extracted instances of the shot clock to be accurate.

In another example, the computing system 100 could determine that a score decreased. As discussed above, a score is unlikely to decrease. Given this, the computing system 100 could determine that decrease of the score is not as expected and could responsively deem the extracted instances of the score to be inaccurate. Other examples are also possible.

In another case, the computing system 100 could make a determination of whether the attribute increased beyond an upper limit of the attribute, and the computing system 100 could determine accuracy based on this determination. Specifically, the computing system 100 could deem the sport-related information to be accurate if the determination is that the attribute did not increase beyond the upper limit. Whereas, the computing system 100 could deem the sport-related information to be inaccurate if the determination is that the attribute increased beyond the upper limit.

By way of example, the computing system 100 could determine that a score increased to a value of three hundred. As discussed above, a score is unlikely to exceed a certain predetermined value (e.g., two hundred) in most sport events. Given this, the computing system 100 could determine that increase of the score a value of three hundred exceeds the predetermined value and thus that the score did not change as expected, and the computing system 100 could responsively deem the extracted instances of the score to be inaccurate. Other examples are also possible.

In yet another case, the computing system 100 could make a determination of whether the attribute decreased beyond a lower limit of the attribute, and the computing system 100 could determine accuracy based on this determination. Specifically, the computing system 100 could deem the sport-related information to be accurate if the determination is that the attribute did not decrease beyond the lower limit. Whereas, the computing system 100 could deem the sport-related information to be inaccurate if the determination is that the attribute decreased beyond the lower limit.

In yet another case, the computing system 100 detects an occurrence at which that the attribute changed by a particular increment as discussed above, could make a determination of whether this particular increment matches an expected increment of change for the attribute, and could determine accuracy based on this determination. Specifically, the computing system 100 could deem the sport-related information to be accurate if the determination is that the particular increment matches the expected increment. On the other hand, the computing system 100 could deem the sport-related information to be inaccurate if the determination is that the particular increment does not match the expected increment.

By way of example, the sport event depicted by the digital video frame might be a basketball game, and a score in a basketball game could only increase by one, two, or three points at any given instance of change of the score, as discussed above. In this example, the computing system 100 could track the score over time until the computing system 100 detects an occurrence where the score changed as discussed, and, at that point, computing system 100 could determine that the score increased by one. Additionally, the computing system 100 could determine according to the mapping data that that the score in a basketball game could only increase by one, two, or three points at any given instance of change of the score. As a result, the computing system 100 could determine that the increment of change of the score (i.e., one) is as expected and could responsively deem the instances of the score (i.e., the instances that represent the occurrence) to be accurate. Other examples are also possible.

In yet another case, the computing system 100 could make a determination of whether a detected rate of increase of the attribute is below a threshold rate of increase of the attribute or rather at or above this threshold rate, and the computing system 100 could determine accuracy based on this determination. Specifically, the computing system 100 could deem the sport-related information to be accurate if the determination is that the detected rate of increase is below the threshold rate. On the other hand, the computing system 100 could deem the sport-related information to be inaccurate if the determination is that the detected rate of increase is at or above the threshold rate.

By way of example, the sport event depicted by the digital video frame might be a basketball game, and a score in a basketball game may be unlikely to increase by more than twenty points in a span of one minute. In this example, the computing system 100 could determine that a score increased by five in a span of one minute and could determine, according to the mapping data, a threshold rate of increase of a score in a basketball game to be twenty points in a span of one minute. As a result, the computing system 100 could determine that the rate of increase of the score is below the threshold rate, and could responsively deem the extracted instances of the score to be in accurate. Other examples are also possible.

In yet another case, the computing system 100 could make a determination of whether a detected rate of decrease of the attribute is below a threshold rate of decrease of the attribute or rather at or above this threshold rate, and the computing system 100 could determine accuracy based on this determination. Specifically, the computing system 100 could deem the sport-related information to be accurate if the determination is that the detected rate of decrease is below the threshold rate. On the other hand, the computing system 100 could deem the sport-related information to be inaccurate if the determination is that the detected rate of decrease is at or above the threshold rate. Other cases are also possible.

Furthermore, the computing system 100 could take certain action(s) according to whether the computing system 100 deems the sport-related information to be accurate or inaccurate. For example, if the above-mentioned determination is that the detected pattern of change of the attribute over the time sequence is the expected pattern of change associated with the sport event, then, responsive to making the determination, the computing system 100 could take a first action that corresponds to the sport-related information being accurate. On the other hand, if the determination is that the detected pattern of change of the attribute over the time sequence is not the expected pattern of change associated with the sport event, then, responsive to making the determination, the computing system 100 could take a second action that corresponds to the sport-related information being inaccurate. Those first and second actions could take various forms.

For example, the first action could involve storing an indication that the sport-related information is accurate, causing presentation of the sport-related information on a user interface, outputting a report related to the sport-related information being accurate, updating a user-account based on the sport-related information, and/or causing presentation of supplemental content based on the sport-related information, among other options.

In another example, the second action could involve storing an indication that the sport-related information is inaccurate, deleting the sport-related information, outputting a report related to the sport-related information being inaccurate, and/or triggering one or more of the procedures described herein to again extract sport-related information from the time sequence of digital video frames, among other options. Other examples are also possible.

Figure 9:
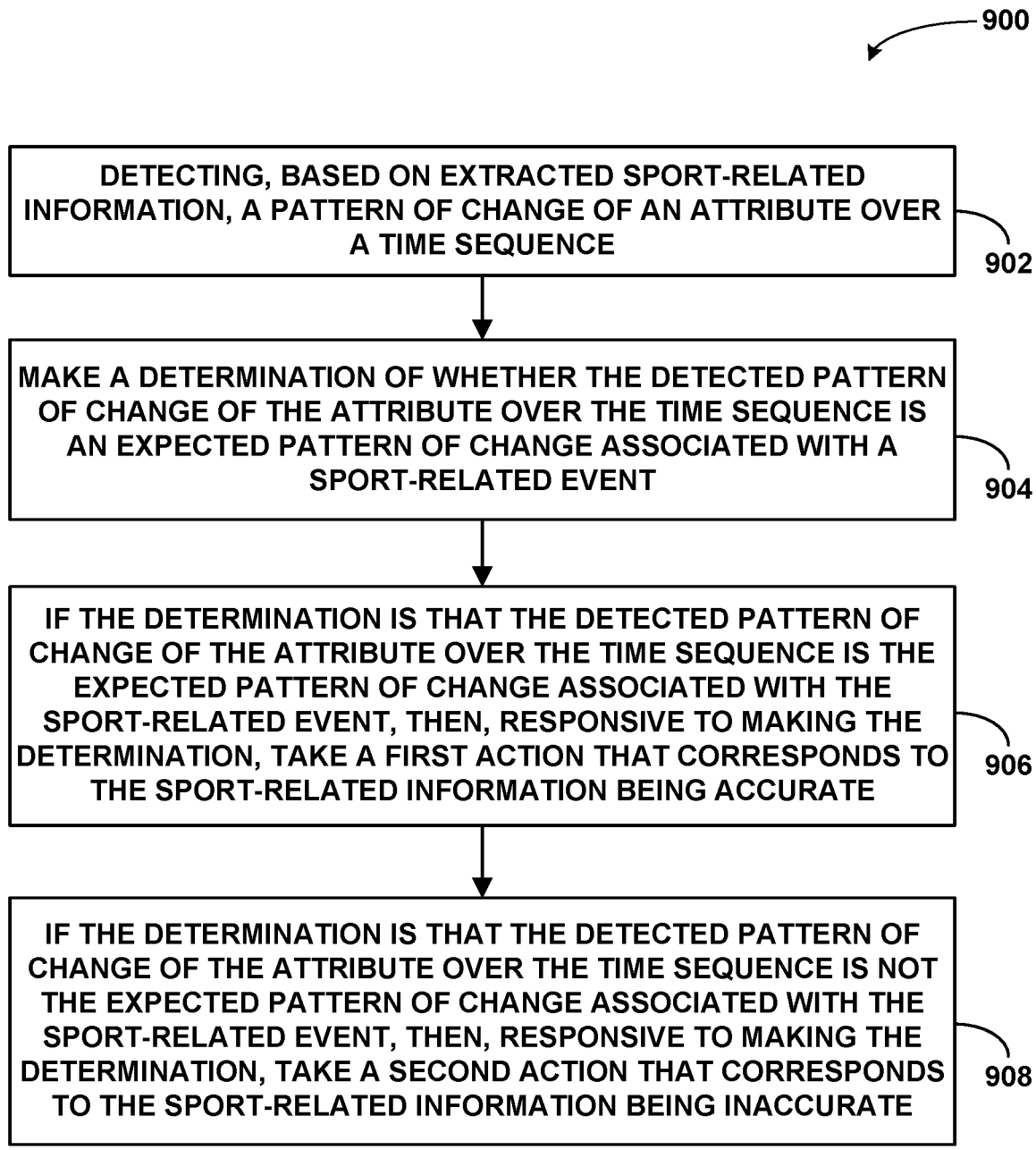
FIG. 9 is yet another flow chart depicting a method that could be carried out in accordance with the disclosure.

FIG. 9 is next another flowchart illustrating a method 900 that can be carried out in accordance with this disclosure. As shown by block 902 in FIG. 9, the method 900 involves detecting, based on extracted sport-related information, a pattern of change of an attribute over the time sequence. At block 904, method 900 then involves making a determination of whether the detected pattern of change of the attribute over the time sequence is an expected pattern of change associated with a sport event.

Additionally, at block 906, method 900 then involves, if the determination is that the detected pattern of change of the attribute over the time sequence is the expected pattern of change associated with the sport event, then, responsive to making the determination, taking a first action that corresponds to the sport-related information being accurate. Further, at block 908, method 900 then involves, if the determination is that the detected pattern of change of the attribute over the time sequence is not the expected pattern of change associated with the sport event, then, responsive to making the determination, taking a second action that corresponds to the sport-related information being inaccurate.

VI. Example Computing System

Figure 10:
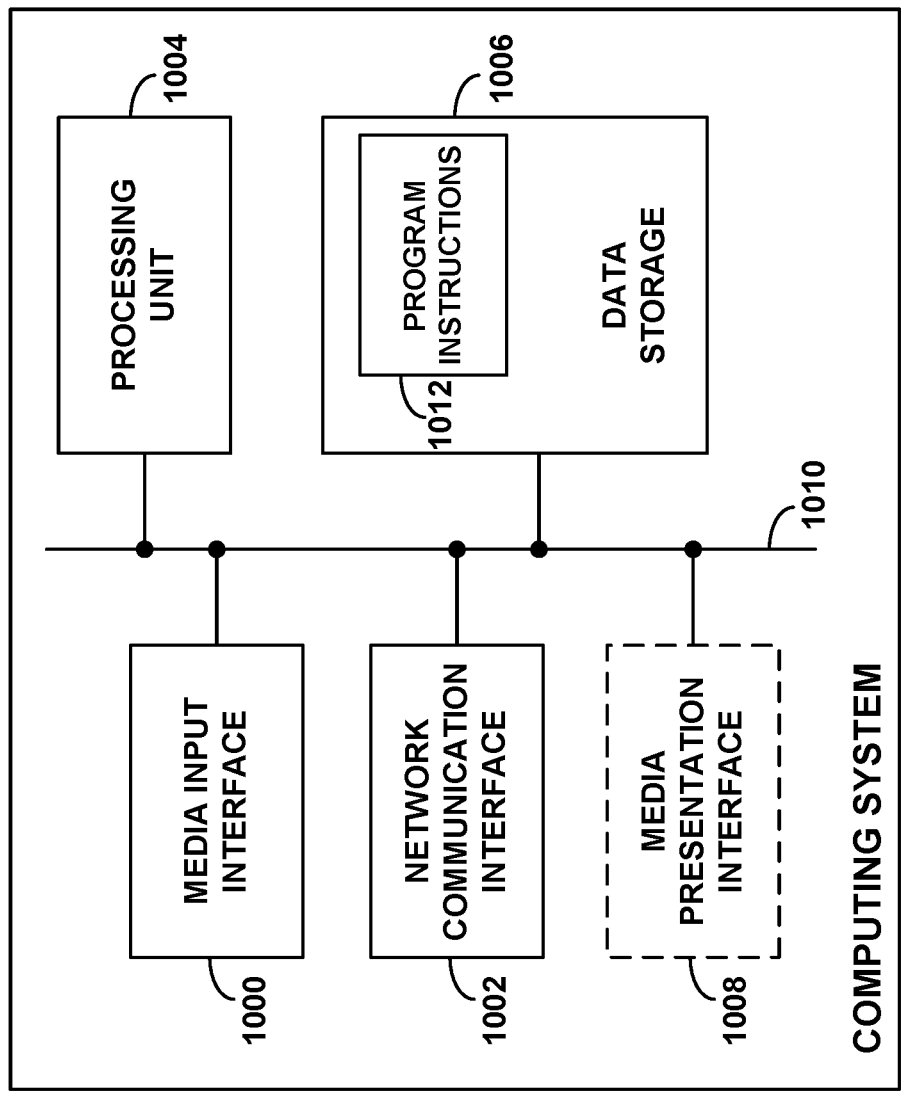
FIG. 10 is a simplified block diagram depicting components of an example computing system that could operate in accordance with the disclosure.

Finally, FIG. 10 is a simplified block diagram of an example computing system, showing some of the components that can be included in such a device to facilitate carrying out operations such as those noted above. In line with the discussion above, this computing system could take various forms. For instance, the computing system could be integrated with a media client, and could thus be a television, computer monitor, or other device that operates to receive and render video content. In other examples, the computing system could be a server device or another device. Numerous other examples are also possible.

As shown in FIG. 10, the example computing system includes a media input interface 1000, a network communication interface 1002, a processing unit 1004, and non-transitory data storage 1006. In some implementation, such as when the computing system is integrated with a media client for example, the computing system could also include a media presentation interface 1008. Nonetheless, any or all of these components could be integrated together or, as shown, communicatively linked together by a system bus, network, or other connection mechanism 1010.

More specifically, the computing system could use media input interface 1000 and/or network communication interface 1002 to receive media streams for presentation. Either of these interfaces could include one or more wired and/or wireless interfaces for establishing communication with and receiving media content in analog or digital form from a receiver, server, or other device or system. For example, the media input interface 1000 could include one or more interfaces compliant with protocols such as DVI, HDMI, VGA, USB, BLUETOOTH, WIFI, among numerous others, and the network communication interface 1002 could comprise a wired or wireless Ethernet interface, for engaging in local or wide area packet-based communication so as to interact with one or more servers and/or other devices or systems.

Media presentation interface 1008 could then comprise one or more components to facilitate presentation of media content. By way of example, the media presentation interface could comprise a user interface such as a display screen and/or a loudspeaker, as well as one or more drivers or other components for processing the received media content to facilitate presentation of the content on the user interface.

Processing unit 1004 could comprise general purpose processor(s) (e.g., microprocessors) and/or specialized processor(s) (e.g., application specific integrated circuits). And non-transitory data storage 1006 could comprise one or more volatile and/or non-volatile storage components, such as optical, magnetic, or flash storage. Further, as shown, data storage 1006 could store program instructions 1012, which could be executable by processing unit 1004 to cause the computing system to carry out various operations described herein.

Exemplary embodiments have been described above. Those skilled in the art will understand, however, that changes and modifications may be made to these embodiments without departing from the true scope and spirit of the invention.

What is claimed is:

1. A method for determining accuracy of sport-related information extracted from a time sequence of digital video frames that represent a sport event, wherein the extracted sport-related information includes an attribute that changes over the time sequence, the method comprising:

detecting by a computing system, based on the extracted sport-related information, a pattern of change of the attribute over the time sequence wherein detecting the pattern of change of the attribute comprises detecting a particular change of the attribute, and wherein the computing system comprises a processing unit;

making a determination, by the computing system, of whether the detected pattern of change of the attribute over the time sequence is an expected pattern of change associated with the sport event wherein making the determination comprises making a determination of whether the particular change corresponds to an increase of the attribute or rather to a decrease of the attribute;

if the determination is that the detected pattern of change of the attribute over the time sequence is the expected pattern of change associated with the sport event, then, responsive to making the determination, the computing system taking a first action that corresponds to the sport-related information being accurate; and if the determination is that the detected pattern of change of the attribute over the time sequence is not the expected pattern of change associated with the sport event, then, responsive to making the determination, the computing system taking a second action that corresponds to the sport-related information being inaccurate.

2. The method of claim 1, wherein the attribute is a score associated with the sport event.

3. The method of claim 1, wherein the attribute is a time depicted by the digital video frames in accordance with the sport event.

4. The method of claim 1,
wherein the sport-related information includes (i) a first instance of the attribute as extracted from a first digital video frame of the digital video frames and (ii) a second instance of the attribute as extracted from a second digital video frame of the digital video frames, and
wherein detecting the pattern of change of the attribute comprises determining at least a difference between the first and second instances of the attribute.

5. The method of claim 4, wherein the second digital video frame immediately follows the first digital video frame in the time sequence.

6. The method of claim 4, further comprising:
determining, by the computing system, a time period between the first and second digital video frames in the time sequence,
wherein making the determination comprises making a determination of whether the determined difference corresponds to an expected difference between the first and second instances of the attribute over the determined time period.

7. The method of claim 1,
wherein detecting the pattern of change of the attribute comprises detecting a rate of increase of the attribute,
wherein making the determination comprises making a determination of whether the detected rate of increase of the attribute is (i) below a threshold rate of increase of the attribute or rather (ii) at or above the threshold rate of increase of the attribute,
wherein the computing system takes the first action if the determination is that the detected rate of increase of the attribute is below the threshold rate of increase of the attribute, and
wherein the computing system takes the second action if the determination is that the detected rate of increase of the attribute is at or above the threshold rate of increase of the attribute.

8. The method of claim 1,
wherein detecting the pattern of change of the attribute comprises detecting a rate of decrease of the attribute,
wherein making the determination comprises making a determination of whether the detected rate of decrease of the attribute is (i) below a threshold rate of decrease of the attribute or rather (ii) at or above the threshold rate of decrease of the attribute,
wherein the computing system takes the first action if the determination is that the detected rate of decrease of the attribute is below the threshold rate of decrease of the attribute, and
wherein the computing system takes the second action if the determination is that the detected rate of decrease of the attribute is at or above the threshold rate of decrease of the attribute.

9. The method of claim 1,
wherein the computing system takes the first action if the determination is that the particular change corresponds to the increase of the attribute, and
wherein the computing system takes the second action if the determination is that the particular change corresponds to the decrease of the attribute.

10. The method of claim 1,
wherein the computing system takes the first action if the determination is that the particular change corresponds to the decrease of the attribute, and
wherein the computing system takes the second action if the determination is that the particular change corresponds to the increase of the attribute.

11. The method of claim 1,
wherein detecting the pattern of change of the attribute comprises detecting that the attribute increased,
wherein making the determination comprises making a determination of whether the attribute increased beyond an upper limit of the attribute,
wherein the computing system takes the first action if the determination is that the attribute did not increase beyond the upper limit of the attribute, and
wherein the computing system takes the second action if the determination is that the attribute increased beyond the upper limit of the attribute.

12. The method of claim 1,
wherein detecting the pattern of change of the attribute comprises detecting that the attribute decreased,
wherein making the determination comprises making a determination of whether the attribute decreased beyond a lower limit of the attribute,
wherein the computing system takes the first action if the determination is that the attribute did not decrease beyond the lower limit of the attribute, and
wherein the computing system takes the second action if the determination is that the attribute decreased beyond the lower limit of the attribute.

13. The method of claim 1,
wherein detecting the pattern of change of the attribute comprises detecting the attribute changed by a particular increment,
wherein making the determination comprises making a determination of whether the particular increment matches an expected increment of change for the attribute,
wherein the computing system takes the first action if the determination is that the particular increment matches the expected increment, and
wherein the computing system takes the second action if the determination is that the particular increment does not match the expected increment.

14. The method of claim 1,
wherein taking the first action comprises one or more of the following:
(i) storing an indication that the sport-related information is accurate,
(ii) causing presentation of the sport-related information,
(iii) outputting a report related to the sport-related information being accurate,
(iv) updating a user-account based on the sport-related information, and
(v) causing presentation of supplemental content based on the sport-related information, and
wherein taking the second action comprises one or more of the following:

(i) storing an indication that the sport-related information is inaccurate,
(ii) deleting the sport-related information,
(iii) outputting a report related to the sport-related information being inaccurate, and
(iv) triggering a machine-driven procedure to again extract the sport-related information from the time sequence of digital video frames that represent the sport event.

15. A computing system comprising:
a processing unit;
non-transitory data storage; and
program instructions stored in the non-transitory data storage and executable by the processing unit to carry out operations for determining accuracy of sport-related information extracted from a time sequence of digital video frames that represent a sport event, wherein the extracted sport-related information includes an attribute that changes over the time sequence, the operations comprising:
  detecting, based on the extracted sport-related information, a pattern of change of the attribute over the time sequence wherein detecting the pattern of change of the attribute comprises detecting a particular change of the attribute,
  making a determination of whether the detected pattern of change of the attribute over the time sequence is an expected pattern of change associated with the sport event, wherein making the determination comprises making a determination of whether the particular change corresponds to an increase of the attribute or rather to a decrease of the attribute,
  if the determination is that the detected pattern of change of the attribute over the time sequence is the expected pattern of change associated with the sport event, then, responsive to making the determination, taking a first action that corresponds to the sport-related information being accurate, and
  if the determination is that the detected pattern of change of the attribute over the time sequence is not the expected pattern of change associated with the sport event, then, responsive to making the determination, taking a second action that corresponds to the sport-related information being inaccurate.

16. The computing system of claim 15, wherein the attribute is (i) a score associated with the sport event or (ii) a time depicted by the digital video frames in accordance with the sport event.

17. The computing system of claim 15,
wherein the sport-related information includes (i) a first instance of the attribute as extracted from a first digital video frame of the digital video frames and (ii) a second instance of the attribute as extracted from a second digital video frame of the digital video frames, and
wherein detecting the pattern of change of the attribute comprises determining at least a difference between the first and second instances of the attribute.

18. The computing system of claim 16,
wherein detecting the pattern of change of the attribute comprises detecting a rate of increase of the attribute,
wherein making the determination comprises making a determination of whether the detected rate of increase of the attribute is (i) below a threshold rate of increase of the attribute or rather (ii) at or above the threshold rate of increase of the attribute,
wherein the computing system takes the first action if the determination is that the detected rate of increase of the attribute is below the threshold rate of increase of the attribute, and
wherein the computing system takes the second action if the determination is that the detected rate of increase of the attribute is at or above the threshold rate of increase of the attribute.

19. A non-transitory computer readable medium having stored thereon instructions executable by a processing unit to cause a computing system to perform operations for determining accuracy of sport-related information extracted from a time sequence of digital video frames that represent a sport event, wherein the extracted sport-related information includes an attribute that changes over the time sequence, the operations comprising:
  detecting, based on the extracted sport-related information, a pattern of change of the attribute over the time sequence wherein detecting the pattern of change of the attribute comprises detecting a particular change of the attribute;
  making a determination of whether the detected pattern of change of the attribute over the time sequence is an expected pattern of change associated with the sport event wherein making the determination comprises making a determination of whether the particular change corresponds to an increase of the attribute or rather to a decrease of the attribute;
  if the determination is that the detected pattern of change of the attribute over the time sequence is the expected pattern of change associated with the sport event, then, responsive to making the determination, taking a first action that corresponds to the sport-related information being accurate; and
  if the determination is that the detected pattern of change of the attribute over the time sequence is not the expected pattern of change associated with the sport event, then, responsive to making the determination, taking a second action that corresponds to the sport-related information being inaccurate.

* * * * *